United States Patent
Rice

Patent Number: 5,815,526
Date of Patent: *Sep. 29, 1998

[54] SIGNAL COMPRISING BINARY SPREADING-CODE SEQUENCES

[75] Inventor: Bart F. Rice, Santa Cruz, Calif.

[73] Assignee: Lockheed Martin Corporation, Bethesda, Md.

[*] Notice: The term of this patent shall not extend beyond the expiration date of Pat. No. 5,452,328.

[21] Appl. No.: 456,077

[22] Filed: May 31, 1995

Related U.S. Application Data

[62] Division of Ser. No. 100,334, Jul. 30, 1993, Pat. No. 5,452,328, which is a continuation of Ser. No. 917,873, Jul. 23, 1992, abandoned, which is a division of Ser. No. 766,372, Sep. 27, 1991, Pat. No. 5,210,770.

[51] Int. Cl.$^6$ .................................................. H04B 1/707
[52] U.S. Cl. ............................................ 375/206; 370/479
[58] Field of Search .................................... 375/200, 206; 370/335, 342, 441, 479; 364/717; 327/164

[56] References Cited

U.S. PATENT DOCUMENTS

| | | | |
|---|---|---|---|
| 3,761,696 | 9/1973 | Russell | 235/152 |
| 3,881,099 | 4/1975 | Ailett et al. | 235/152 |
| 4,320,513 | 3/1982 | Lampert | 370/342 |
| 4,325,129 | 4/1982 | Groth, Jr. | 364/717 |
| 4,348,597 | 9/1982 | Weber | 307/269 |
| 4,460,992 | 7/1984 | Gutleber | 370/19 |
| 4,493,046 | 1/1985 | Watanabe | 364/717 |
| 4,527,275 | 7/1985 | Russell | 375/1 |
| 4,606,039 | 8/1986 | Nicolas et al. | 375/1 |
| 4,649,419 | 3/1987 | Arragon et al. | 380/20 |
| 4,707,839 | 11/1987 | Andren et al. | 380/42 |
| 4,730,340 | 3/1988 | Frazier, Jr. | 375/1 |
| 4,791,594 | 12/1988 | Harney et al. | 364/717 |
| 4,809,295 | 2/1989 | Zscheile, Jr. et al. | 375/1 |
| 4,852,023 | 7/1989 | Lee et al. | 364/717 |
| 4,860,353 | 8/1989 | Brown | 380/44 |
| 4,872,200 | 10/1989 | Jansen | 380/34 |
| 4,890,252 | 12/1989 | Wang | 364/717 |
| 4,965,881 | 10/1990 | Dilley | 380/50 |
| 4,984,247 | 1/1991 | Kaufmann et al. | 375/1 |
| 5,008,938 | 4/1991 | Freeburg et al. | 380/50 |
| 5,016,206 | 5/1991 | Shinonaga | 364/715.11 |
| 5,029,180 | 7/1991 | Cowart | 375/1 |
| 5,031,173 | 7/1991 | Short et al. | 370/18 |
| 5,046,036 | 9/1991 | Tezuka | 364/717 |
| 5,062,121 | 10/1991 | Kurihara et al. | 375/1 |
| 5,063,571 | 11/1991 | Vancraeynest | 375/1 |
| 5,079,733 | 1/1992 | Antoine et al. | 364/717 |
| 5,084,900 | 1/1992 | Taylor | 375/1 |
| 5,090,023 | 2/1992 | Watanabe | 375/1 |
| 5,099,493 | 3/1992 | Zeger et al. | 375/1 |
| 5,111,478 | 5/1992 | McDonald | 375/1 |
| 5,157,689 | 10/1992 | Kurihara | 375/200 |
| 5,452,328 | 9/1995 | Rice | 375/210 |

Primary Examiner—Stephen Chin
Assistant Examiner—Jeffrey W. Gluck
Attorney, Agent, or Firm—Fenwick & West LLP; John J. Morrissey

[57] ABSTRACT

A method and apparatus for electrically generating sets of binary spreading-code sequences for use in a multi-node communication network. Also, a method for assigning disjoint sets of binary spreading-code sequences to different nodes of such a network. Each set of binary spreading-code sequences consists of multiple sequences, which are generated using two binary shift registers. The sequences can be generated simultaneously, or sequence segments can be generated sequentially. To generate sequences simultaneously, the contents of multiple pairs of stages of two linear-feedback binary shift registers are combined by modulo-2 addition, where each pair of stages consists of one stage from each of the two binary shift registers. To generate sequence segments sequentially, the contents of a single stage of a first binary shift register are combined by modulo-2 addition with the contents of a single stage of a second binary shift register, where new fills are switched into each of the registers at the beginning of each period. To assign disjoint sets of binary spreading-code sequences to different nodes of the network, the initial fill of the first binary shift register is fixed and different initial fills are specified for the second binary shift register.

2 Claims, 10 Drawing Sheets

FIG_1

SIGNAL COMPRISING BINARY SPREADING-CODE SEQUENCES

This is a divisional application of U.S. patent application Ser. No. 08/100,334 filed Jul. 30, 1993 (now U.S. Pat. No. 5,452,328), which application was filed as a continuation of U.S. patent application Ser. No. 07/917,873 filed Jul. 23, 1992, now abandoned, which application was a division of U.S. patent application Ser. No. 07/766,372 filed Sep. 27, 1991 (now U.S. Pat. No. 5,210,770).

TECHNICAL FIELD

This invention relates generally to digital communication systems, and more particularly to a spectrum spreading technique for use in multi-node digital communication systems such as digital networks and digital radios.

BACKGROUND OF THE INVENTION

Spectrum spreading techniques for use in digital communication networks have been described in many books and papers. A classic publication in this filed is *Spread Spectrum Communications* by M. K. Simon, J. K. Omura, R. A. Scholtz and B. K. Levitt, Computer Science Press, 11 Taft Court, Rockville, Md. 20850, 1985. Particular kinds of spectrum spreading techniques that have been implemented in digital communication networks in the prior art include "direct-sequence spreading", "frequency hopping", "time hopping", and various hybrid methods that involve combinations of the aforementioned techniques.

Multi-node spread-spectrum communication networks developed in the prior art were generally characterized as code-division multiple-access (CDMA) networks, which utilized "code-division multiplexing" (i.e., a technique in which signals generated by different spreading-code sequences simultaneously occupy the same frequency band). Code-division multiplexing requires that the simultaneously used spreading codes be substantially "mutually orthogonal", so that a receiver with a filter matched to one of the spreading codes rejects signals that have been spread by any of the other spreading codes.

In a typical multi-node spread-spectrum communication network using either a conventional direct-sequence spectrum spreading technique, or a hybrid technique involving, e.g., direct-sequence and frequency-hopped spectrum spreading, only a single spreading code is employed. At regular intervals, the polarity of the spreading code is either inverted (i.e., each 0 is changed to 1, and each 1 is changed to 0) or left unchanged, depending on whether the next bit of information to be transmitted is a 1 or a 0. The resulting signal is an "information-bearing" sequence, which ordinarily would be transmitted using some type of phase-shift keyed (PSK) modulation—usually, binary phase-shifted keyed (BPSK) modulation or quaternary phase-shift keyed (QPSK) modulation.

A publication entitled *Spread Spectrum Techniques Handbook*, Second Edition, March 1979, which was prepared for the National Security Agency by Radian Corporation of Austin, Tex., describes a number of spread-spectrum techniques that had been proposed in the prior art. Of particular interest is a direct-sequence technique described on page 2–21 et seq. of the *Spread Spectrum Techniques Handbook*, which involved transmitting one bit of information (either a 0 or a 1) by switching between two independent signals that are generated by two different spreading codes. Ideally, the spreading codes of the two independent signals could be "almost orthogonal" with respect to each other, so that cross-correlation between the two sequences is very small. In practice, in such early spread-spectrum communications systems, the two independent signals were maximal-length linear recursive sequences (MLLRSs) often called "M-sequences", whose cross-correlations at all possible offsets had been computed and found to be acceptably low. However, this technique of switching between two independent signals did not achieve widespread acceptance, mainly because it required approximately twice the electronic circuitry of a polarity-inversion technique without providing any better performance.

Two recent papers, viz., "Spread-Spectrum Multiple-Access Performance of Orthogonal Codes: Linear Receivers" by P. K. Enge and D. V. Sawate, (*IEEE Transactions on Communications*, Vol. COM-35, No. 12, December 1987, pp. 1309–1319), and "Spread-Spectrum Multiple-Access Performance of Orthogonal Codes for Indoor Radio Communications" by K. Pahlavan and M. Chase (*IEEE Transactions on Communications*, Vol. 38, No. 5, May 1990, pp. 574–577), discuss multi-node spread-spectrum communication networks in which multiple orthogonal sequences within a relatively narrow bandwidth are assigned to each node, whereby a corresponding multiplicity of information bits can be simultaneously transmitted and/or received by each node—thereby providing a correspondingly higher data rate. A specified segment of each sequence available to a node of the network is designated as a "symbol". In the case of a repetitive sequence, a symbol could be a complete period of the sequence. The time interval during which a node transmits or receives such a symbol is called a "symbol interval". In a multi-node spread-spectrum network employing multiple orthogonal sequences, all the nodes can simultaneously transmit and/or receive information-bearing symbols derived from some or all of the sequences available to the nodes.

The emphasis in the aforementioned Enge et al. and Pahlavan et al. papers is on network performance, especially in certain kinds of signal environments. Neither paper recommends or suggests using any particular set of mutually orthogonal spreading codes for generating multiple orthogonal sequences; and neither paper discloses now to derive or generate suitable mutually orthogonal spreading codes. However, methods of generating families of sequences that are pairwise "almost orthogonal" by using two-register sequence generators have been known for some time.

In a paper entitled "Optimal Binary Sequences for Spread-Spectrum Multiplexing" by R. Gold (*IEEE Transactions on Information Theory*, Vol. IT-13, October 1967, pp. 119–121), so-called "Gold codes" were proposed for use as spreading codes in multi-node direct-sequence spread-spectrum communication networks of the CDMA type. A Gold code is a linear recursive sequence that is generated by a product $f_1 f_2$, where $f_1$ and $f_2$ comprise the members of a so-called "preferred pair" of primitive polynomials of the same degree n over a field GF(2). A primitive polynomial of degree n is defined as a polynomial that generates a maximal-length linear recursive sequence (MLLRS), which has a period of ($2^n-1$). The required relationship between $f_1$ and $f_2$ that makes them a preferred pair is described in the aforementioned paper by R. Gold.

A Gold code is a particular kind of "composite code". Other kinds of composite codes include "symmetric codes" and "Kasami codes". A symmetric code is similar to a Gold code in being generated by a product $f_1 f_2$ of a pair of primitive polynomials, except that for a symmetric code the polynomial $f_2$ is the "reverse" of primitive polynomial $f_1$, i.e., $f_2(x)=x^n f_1(1/x)$, where n=deg $f_1$=deg $f_2$. The correlation properties of Gold codes and symmetric codes are discussed in a paper entitled "Crosscorrelation Properties of Pseudo-random and Related Sequences" by D. V. Sarwate and M. B. Pursley, (*Proceedings of the IEEE*, Vol. 68 No. 5 (May 1980, pp. 593–619). Kasami codes differ from Gold codes in that for Kasami codes, the polynomials $f_1$ and $f_2$ are not of the same degree. Kasami codes are also discussed in the aforementioned paper by M. B. Pursley and D. V. Sarwate. The concept of a "composite code" can be broadened to include sequences obtained from a two-register sequence generator, where the sequences generated in the two registers can be quite general.

Predominant among the reasons that have militated against using direct-sequence spreading codes for multi-node spread-spectrum communication networks of the prior art is the so-called "near-far" problem. If the nodes of a multi-node spread-spectrum communication network are widely distributed so that power levels for different nodes can differ markedly at a given receiver in the network, then at the given receiver the correlations of a reference sequence with a sequence that is transmitted by a nearby node are apt to be stronger than correlations of the reference sequence with a version of the reference sequence that has been transmitted from a greater distance. Adverse effects of the "near-far" problem can include periodic strong correlations in information-bit errors, and false synchronization. To avoid such adverse effects, frequency hopping has been preferred in the prior art for multi-node spread-spectrum communication networks—especially for tactical networks where the nodes are widely distributed. Until recently, most of the research funding and efforts in connection with multi-node spread-spectrum communication networks have been directed toward tactical networks, thereby virtually precluding significant research on direct-sequence spread-spectrum communication networks.

Hybrid frequency-hopped and direct-sequence spread-spectrum communication networks have been proposed for tactical applications. However, the frequency diversity provided by "hopping" of the carrier readily enables rejection of unintended signals, thereby making the choice of a particular spreading-code sequence relatively unimportant. Consequently, there has been substantially no research in the prior art on the use of Gold codes and other composite codes for hybrid frequency-hopped and direct-sequence spread-spectrum communication networks.

Direct-sequence spread-spectrum communication networks have received recent attention in connection with the development of wireless local area networks (LANs), personal communications networks (PCNs), and cellular telephone networks utilizing communications satellites. The "near-far" problem is ordinarily not an issue for LANs and PCNs, because the nodes in such networks are generally distributed at distances that are not very far from each other. For cellular telephones, the "near-far" problem is not an issue in satellite applications, because all transmitters in the "spot beam" from a satellite are roughly at the same distance from the satellite.

Several wireless LANs are described in an article entitled "Spread Spectrum Goes Commercial" by D. L. Schilling, R. L. Pickholtz and L. B. Milstein, *IEEE Spectrum*, Vol. 27, No. 6, August 1990, pp. 40–45. For indoor spread-spectrum communication networks (e.g., wireless LANs), spectrum spreading has commonly been employed in "star network" configurations. In a star network, the nodes are normally synchronized with a master controller, so that each node of the network can use a different offset of the same spreading-code sequence. False synchronization is not ordinarily encountered with star networks. In circumstances in which two or more star networks, each utilizing a different spreading-code sequence, operate in close proximity to each other, composite codes could be used to advantage to prevent interference between neighboring star networks. However, in the prior art, reliance has usually been placed upon the distance between the individual star networks, and upon signal-attenuating structures (e.g., walls) separating the individual star networks, as well as upon cross-correlation properties that are expected of random uncorrelated spreading-code sequences, to enable one star network to reject signals from another star network in its vicinity. Consequently, composite codes have generally not been used in star networks.

In PCNs, the use of composite codes as spreading-code sequences has not yet received much attention, because factors such as size, weight and power considerations have generally favored simplicity over performance. Techniques involving satellite-based CDMA cellular radio networks have emerged from developments in wireless LANs, but have generally been concerned with coding and systems engineering rather than with spreading-code sequence generation.

To date, direct-sequence spectrum spreading techniques have been used primarily in applications requiring high multipath immunity, good time resolution, robustness, privacy and low probability of detection, and for which in-band interference and the "near/far" problem are manageable. Such applications have included satellite communications, star networks in office environments, mobile radio, and positioning and navigation applications. The use of composite codes (e.g., Gold codes or symmetric codes) for spectrum spreading in such applications has not heretofore been deemed appropriate, because composite codes would require significantly greater hardware complexity to implement than MLLRSs without seeming to provide sufficient compensating advantages over MLLRSs in terms of processing gain, the number of nodes that can be accommodated, the rate of data transmission, or robustness.

SUMMARY OF THE INVENTION

It is a general object of the present invention to provide a spread-spectrum technique for use in a multi-node digital communication network, whereby a unique set of spreading-code sequences is assigned to each node of the network for transmitting digital signals.

It is a particular object of the present invention to provide a method for generating a family of nearly orthogonal spreading-code sequences, and for assigning a unique set of spreading-code sequences from the family of sequences so generated to each node of a multi-node digital communication network.

It is also a particular object of the present invention to provide methods for selecting a set of one or more spreading-code sequences that can be used during a specified period of time (i.e., a so-called "symbol interval") to convey multiple bits of information, if the selected sequence or sequences of the set are modulated and transmitted simultaneously.

It is likewise a particular object of the present invention to provide logic circuit designs for hardware implementation of methods for generating a family of spreading-code sequences for assignment to the nodes of a multi-node digital communication network.

It is a further object of the present invention to provide methods for simultaneously modulating a set of carriers of the same frequency but of different phases in order to enable multiple bits of information to be transmitted on each carrier of the set.

It is another object of the present invention to provide a spread-spectrum technique for use in a multi-node digital communication network, which can readily incorporate standard error-control coding (whose parameters are matched to the particular application) into the transmission and reception of digital signals propagated by the network.

It is also an object of the present invention to provide a technique whereby conventional equipment designed for generating arbitrary spreading-code sequences can be adapted to the task of generating a family of spreading-code sequences for use in a multi-node digital communication network.

It is a further object of the present invention to provide a technique whereby direct-sequence spectrum spreading, or a hybrid combination of direct-sequence and frequency-hopped spectrum spreading, can be utilized in conjunction with code diversity or "code hopping" in a spread-spectrum digital communication network designed to have a low probability of intercept (LPI).

It is also an object of the present invention to provide symbol detection methods, which enable a receiver at any given node in a multi-node spread-spectrum digital communication network to determine the most likely spreading-code sequence or sequences transmitted by another node of the network attempting to communicate with the given node.

BEST MODE OF CARRYING OUT THE INVENTION

Figure 1:
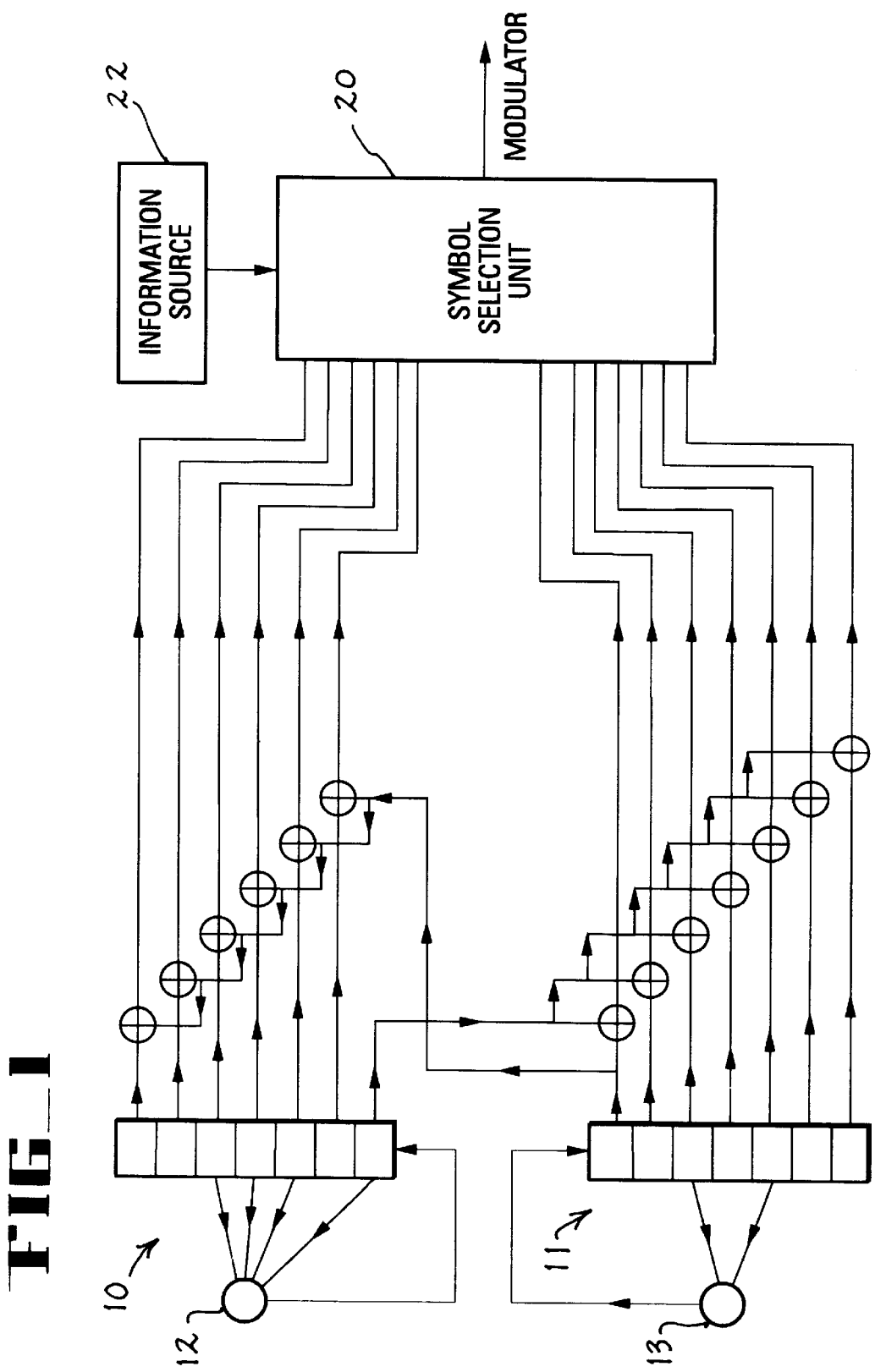
FIG. 1 is a schematic illustration of an apparatus for generating a family of nearly orthogonal spreading-code sequences of the composite code type, and for selecting unique sets of the sequences so generated for assignment to corresponding nodes of a multi-node digital communication network according to the present invention.

In accordance with the present invention, a family of "almost orthogonal" binary sequences is generated to provide disjoint sets of spreading-code sequences that can be assigned to corresponding nodes of a multi-node digital communication network. Each node of the network is allotted multiple spreading-code sequences, which are selected from the total number of available sequences provided by the family of "almost orthogonal" binary sequences. The spreading-code sequences assigned to the various nodes of the network are all modulo-2 sums (i.e., "EXCLUSIVE OR" outputs) of the contents (also called the "fills") of successive stages in two so-called "shift registers".

The binary sequences from which the disjoint sets of spreading-code sequences are selected for assignment to the nodes of the network are said to be "almost orthogonal" because the selected binary sequences all have low auto-correlation values (except for offset 0), and all have low cross-correlation values relative to each other, where the auto-correlations and the cross-correlations are performed over a specified number of bits that defines a so-called "symbol interval". For algebraically generated periodic linear recursive sequences that are selected for their favorable auto-correlation and cross-correlation properties, the optimum symbol interval for a given sequence coincides with the period of the sequence. For sequences generated by a non-linear random number generator, and for linear recursive sequences of very long period, the symbol interval for a given sequence can be chosen arbitrarily—in which case the auto-correlation and cross-correlation properties of the sequences cannot be guaranteed, but have the usual statistics for correlations of random sequences.

As example of a set of binary spreading-code sequences that could be used in a multi-node digital communication network according to the present invention would be a set of Gold code sequences, each of which is generated by the product $f_1f_2$ of a "preferred pair" ($f_1$, $f_2$) of primitive polynomials of the same degree n over the field GF(2), i.e., the algebraic field of two elements 0 and 1. A primitive polynomial over GF(2) is a polynomial that generates a maximal-length linear recursive sequence (MLLRS). If the degree of the primitive polynomials $f_1$ and $f_2$ is n, the period of the Gold code sequences generated by the product $f_1f_2$ is ($2^n-1$).

Another example of a set of binary spreading-code sequences that is suitable for use in a multi-node digital communication network would be a set of so-called "symmetric" sequences, each of which is generated by the product $f_1f_2$, where $f_1$ and $f_2$ are primitive polynomials, and where $f_2$ is the "reverse" of $f_1$, i.e., $$f_2(x)=x^n f_1(1/x),$$

where n=deg $f_1$=deg $f_2$.

Yet another example of a set of binary spreading-code sequences that could be employed in a multi-node digital communication network according to the present invention would be a set of Kasami code sequences, each of which is generated by a product $f_1f_2$, where $f_1$ and $f_2$ are primitive polynomials such that the degree of one of the polynomials divides the degree of the other.

The auto-correlation properties of composite-code sequences (e.g., Gold code sequences, symmetric code sequences and Kasami code sequences), and the cross-correlation properties of families of such composite-code sequences over an entire period, are described in the aforementioned article by M. B. Pursley et al. wherein such sequences are shown to be "almost orthogonal."

Alternatively, a set of random spreading-code sequences could also be used in practicing the present invention. While composite-code sequences are especially useful and convenient for particular embodiments of a multi-node digital communication network according to the present invention, it is not necessary to limit the invention in principle to the use of any particular kinds of spreading-code sequences. The salient characteristic of a network according to the present invention is a two-register sequence generator, which enables multiple spreading-code sequences to be obtained by combining the outputs of selected stages of each of the two registers.

Various embodiments of a multi-node digital communication network according to the present invention are described hereinafter. In each of these embodiments, a family of binary spreading-code sequences can be generated using Gold code sequences, or "symmetric" sequences, or Kasami code sequences, or any other suitable sequence generation scheme. From the family of binary spreading-code sequences so generated, a unique set of multiple spreading-code sequences is assigned to each node of the network. Specified codes, or their reciprocals (i.e., codes of opposite polarity), are selected periodically for transmission by each node, where the particular codes and polarities that are selected in a particular case depend upon the information to be conveyed. Since information is conveyed in blocks, Reed-Solomon coding (or any other suitable coding scheme) can optionally be used to provide forward error control.

Symbol decision methods (i.e., methods that can be used by a receiver to determine the most likely transmitted sequence or sequences) can vary for different embodiments of the present invention. In each embodiment, the receiver identifies those particular incoming sequences having the strongest correlation, values, and determines their polarities. The decision logic algorithm for each embodiment determines the most likely transmitted sequence or sequences from the correlation values.

If Gold code sequences, or "symmetric" sequences, or Kasami code sequences are used as the spreading-code sequences, mathematically guaranteed cross-correlation properties of those sequences over an entire period can be exploited by taking the symbol interval to be equal to the period of the spreading-code sequences. According to one method for ensuring that modulation is "balanced" (i.e., that equal numbers of 0's and 1's are transmitted during each symbol interval), the symbol interval is taken to be equal to twice the period of the spreading-code sequences, and the spreading-code sequences are transmitted so that a complete sequence is transmitted, during the first half of a symbol interval and so that the reciprocal of that sequence is transmitted, during the second half of the symbol interval. This method produces a factor-of-two decrease in the symbol rate for a given "chip rate" (i.e., the rate at which individual bits of the spreading-code sequences are transmitted).

Acquisition and maintenance of synchronization for spread-spectrum signals have been widely discussed in published literature. In each embodiment of the present invention, synchronization of each incoming sequence with the spreading-code sequences that have been assigned to a given node is acquired by conventional means. Synchronization is maintained, and the possibility of false synchronization is minimized, by using a two-register sequence generator to generate candidate spreading-code sequences that are to be correlated with each incoming sequence. If synchronization of an incoming sequence with the sequences assigned to the given node is lost, that incoming sequence does not correlate strongly with any of the candidate spreading-code sequences. However, if synchronization is maintained, the incoming sequences that are most likely to be signals transmitted by other nodes of the network are determined. A stream of information bits is then assembled from the incoming sequences identified as likely to be information-bearing signals. If forward error correction has been used, the information bit stream is decoded to determine the information originating at the transmitting node of the network.

A specified number K of available spreading-code sequences is assigned to each node of a network according to the present invention. The number of information bits that can be conveyed per symbol varies directly with the value of the number K. If the total number of spreading-code sequences available to the network is N, then the maximum number of nodes that can be accommodated by the network is N/K. Thus, there is a trade-off between the number of information bits that can be conveyed per symbol and the maximum number of nodes that can be accommodated by the network.

In embodiments of the present invention in which composite codes are employed, the individual spreading-code sequences assigned to a given node of the network may be specified by feedback taps associated with the polynomials $f_1$ and $f_2$, and by the initial "fills" (i.e., contents) of shift registers corresponding to the polynomials $f_1$ and $f_2$. Various methods can be used to specify the polynomials $f_1$ and $f_2$, and to specify the initial fills of the $f_1$-register (i.e., the register whose feedback taps correspond to the polynomial $f_1$) and the $f_2$-register (i.e., the register whose feedback taps correspond to the polynomial $f_2$) for each node of the network. A preferred method is for the fill associated with the polynomial $f_1$ to remain always the same for all the nodes of the network, and for the initial fill associated with the polynomial $f_2$ for each particular node to be specified or derived from a specified fill. Thus, the unchanging fill for the $f_1$-register for every node of the network could consist of the so-called "impulse fill," i.e., a 1 as the content of the first stage of the register and 0's as the contents of the remaining stages of the register. If there are V nodes in the network and each node is identified by a corresponding integer v, where $0 \leq v \leq V-1$, and if K spreading-code sequences are assigned to each node, the initial fill for the $f_2$-register of the vth node could be obtained by first loading the $f_2$-register with the initial fill of the network controller (designated as "node 0"), and then stepping the $f_2$-register Kv times.

If composite codes are used for the spreading-code sequences, and if the number of "composite sequences" assigned to each node of the network equals or exceeds KV, where a "composite sequence" is the modulo-2 sum of a non-zero sequence generated by $f_1$ and a non-zero sequence generated by $f_2$, the aforedescribed method is sufficient for specifying the initial fills of the $f_1$-register and the $f_2$-register. For example, if Gold code sequences are used for which deg $f_1$=deg $f_2$=n, the aforedescribed method is sufficient for specifying the initial fills of the $f_1$-register and the $f_2$-register, provided that $KV \leq (2^n-1)$. If $KV=2^n$, the MLLRS generated by either $f_1$ or $f_2$ must be used by one of the nodes as one of its symbols. If $KV=(2^n+1)$, the MLLRS generated by $f_1$ and the MLLRS generated by $f_2$ must both be used (either both of the MLLRSs by one node, or each of the MLLRSs by a different node) as symbols. The assignment of initial fills to the two registers must the be modified accordingly.

EMBODIMENT I

In a particular embodiment of a multi-node digital communication network according to the present invention as illustrated in FIG. 1, a composite code sequence (e.g., a Gold code sequence, a symmetric sequence, a Kasami code sequence, or the like) is used as the spreading-code sequence, and one sequence at a time is transmitted. The number K of spreading-code sequences assigned to each node of the network is $2^r$, where r is a positive integer such that $$1 \leq r \leq [\log_2(M_1+M_2-1)],$$

where $[\log_2(M_1+M_2-1]$ denotes the "greatest integer" function, where $M_1$ and $M_2$ represent the numbers of stages in corresponding registers of the two-register spreading-code sequence generator. In the following discussion, it is assumed that $M_1=M_2=M$. Modification of the discussion to accommodate a situation in which the registers have different "lengths" (i.e., different numbers of stages) is straightforward.

A spread-spectrum digital communication system according to the present invention can be constructed for the most part from commercially available components. Specially designed components are required only for the spreading-code sequence generator and associated parallel sequence correlators. In FIG. 1, a spreading-code sequence generator is illustrated, which comprises a pair of so-called "shift registers" for producing a corresponding pair of spreading-code sequences. In principle, however, a sequence generator that produces more than two spreading-code sequences could be used in practicing the present invention. A "shift register" basically comprises a set of "stages" (also called "flip-flops"), which are coupled so that the contents of one stage can be transferred to a different stage upon the occurrence of an externally generated timing pulse.

The spreading-code sequence generator illustrated in FIG. 1 comprises two "shift registers" 10 and 11, which produce two corresponding spreading-code sequences. The shift registers 10 and 11 are illustrated in FIG. 1 as being of the same size M (i.e., both have the same number of stages); although there is no requirement in principle that both of the shift registers 10 and 11 have the same number of stages. For the embodiment illustrated in FIG. 1, each of the shift registers 10 and 11 has a size indicated by the parameter M=7, which indicates seven "stages" or "flip-flops". The number of stages provided in commercially available shift registers is usually a multiple of 8.

Each of the shift registers 10 and 11 is "driven" by a polynomial, which is one of a preferred pair of primitive polynomials $f_1$ and $f_2$ of degree n, where $n \leq M$. A set of feedback taps 12 is provided to "drive" the shift register 10, and a set of feedback taps 13 is provided to "drive" the shift register 11. For purposes of illustration, the polynomials $f_1$ and $f_2$ are of degree n=5. The feedback taps 13 correspond to the polynomial $$f_1(x)=1+x^2+x^5;$$

and the feedback taps 12 correspond to the polynomial $$f_2(x)=1+x+x^2+x^4+x^5.$$

A "symbol selection" unit 20 receives corresponding spreading-code sequences from the shift registers 10 and 11. The purpose of the symbol selection unit 20 is to select one of the spreading-code sequences produced by the shift registers 10 and 11 for transmission to a modulator during each specified symbol interval. The symbol selection unit 20 also receives a sequence of information bits provided by an information source 22. These information bits may be encrypted and encoded, as discussed hereinafter.

If $2^r$ spreading-code sequences are available to each node of the network, the stream of information bits is partitioned into blocks of (r+1) bits. The first r of these bits serve as an address in a table, which contains the number of the spreading-code sequence to be transmitted during the next symbol interval. The (r+1)th bit is a "differential encoding" bit, which determines whether the sequence to be transmitted during the next symbol interval is "inverted" (i.e., complemented modulo 2) or "upright" (i.e., not inverted). Thus, if the (r+1) th bit is a 1, the next transmitted sequence has a "polarity" opposite that of the current sequence; and if the (r+1)th bit is a 0, the next transmitted sequence has the same "polarity" as the current sequence. For example, if the current sequence is upright, and the (r+1)th bit is a 1, the next transmitted sequence is inverted. Similarly, if the current sequence is upright, and the (r+1)th bit is a 0, the next transmitted sequence is upright.

The technique of partitioning information bits into blocks of bits (i.e., the "blocking" of encrypted bits) as described above is especially well suited to the use of Reed-Solomon spreading-code sequences. In the foregoing example in which $2^r$ spreading-code sequences are available to each node of the network (r+1)-bit blocks of information are interpreted by a Reed-Solomon encoder as elements of the finite field $GF(2^{r+1})$. These field elements are assembled into blocks to which redundant field elements are appended in accordance with the particular Reed-Solomon coding scheme used. A discussion of Reed-Solomon codes is found in a text by F. J. MacWilliams and N. J. A. Sloane entitled "The Theory of Error Correcting Codes", North-Holland Publishing Company, New York, (1978), pp. 301–305. Reed-Solomon codewords are then furnished to the symbol selection unit 20, which uses each field element of (r+1)-bits to select a sequence and a polarity for transmission during the next symbol interval.

Figure 2:
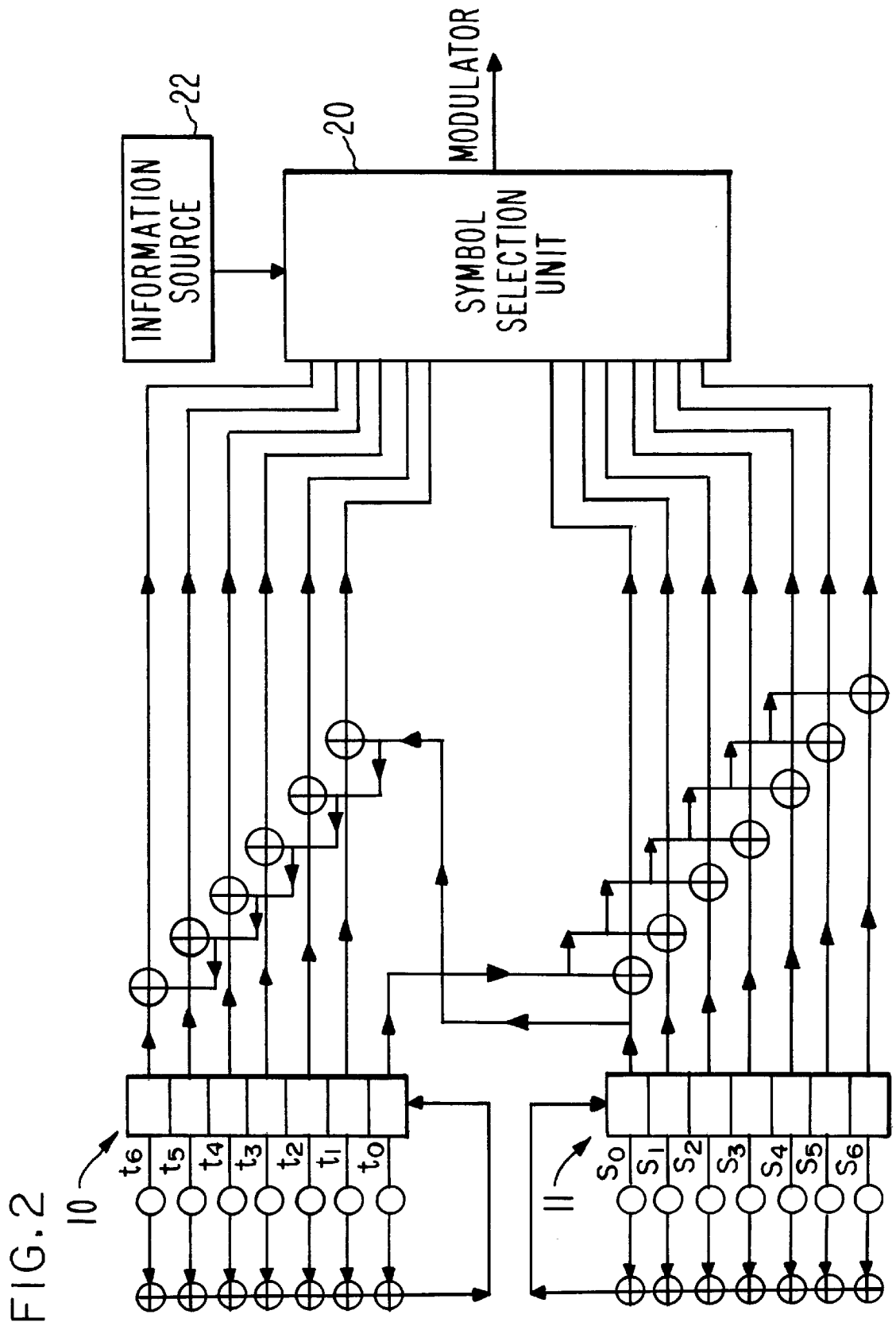
FIG. 2 is a schematic illustration of an alternative embodiment of a spreading-code sequence generator for use in the apparatus of FIG. 1, which allows register taps to be arbitrarily selected for summation (i.e., "EXCLUSIVE OR") and feedback functions.

In FIG. 2, a more general configuration for the spreading-code sequence generator is shown, which enables the individual register taps to be arbitrarily selected for the summation (i.e., EXCLUSIVE OR) and feedback functions. In the configuration of FIG. 2, the locations of the feedback taps are not "hardwired", but are programmable. Thus, the particular generating polynomials $f_1$ and $f_2$ can be arbitrarily assigned, and can be changed periodically if desired. As indicated in FIG. 2, parameters $t_0, \ldots, t_6$ and $s_0, \ldots, s_6$ represent corresponding stages in the shift registers 10 and 11, respectively. Each of the parameters $t_0, \ldots, t_6$ and $s_0, \ldots, s_6$ takes the value 1 or 0 according as the corresponding register stage is tapped or not tapped.

Regardless of the type of sequence generator used (i.e., whether of the "hardwired" type as illustrated in FIG. 1 or of the programmable type as illustrated in FIG. 2), if the sequence of 0's and 1's emanating from a particular stage of one register (e.g., the "bottom stage" of the upper register as shown in either FIG. 1 or FIG. 2) is denoted by $\{a_k\}$, and if the sequence of 0's and 1's emanating from a correspondingly particular stage of the other register (e.g., the "top stage" of the lower register as shown in FIG. 1 or FIG. 2) is denoted by $\{b_k\}$, the (2M−1) spreading-code sequences available from the modulo-2 adders are $$\{a_k+b_{k-i}\}, \text{ where } i=1, 2, \ldots, M-1, \text{ and}$$

$$\{a_{k-i}+b_k\}, \text{ where } i=0, 1, \ldots, M-1.$$

These spreading-code sequences, $\{a_k+b_{k-i}\}$ and $\{a_{k-i}+b_k\}$, are distinct from each other. In the case where Gold code sequences are used, the sequences $\{a_k+b_{k-i}\}$ and $\{a_{k-i}+b_k\}$ constitute a subset of size (2M−1) of a set of ($2^n+1$) non-zero linear recursive sequences generated by the polynomial product $f_1 f_2$. Only ($2^n-1$) of the ($2^n+1$) spreading-code sequences generated by the polynomial product $f_1 f_2$ have the product $f_1 f_2$ as their "minimal polynomial". The other two sequences, viz., $\{a_k\}$ and $\{b_k\}$, are generated individually by polynomials $f_2$ and $f_1$, respectively.

Figure 3:
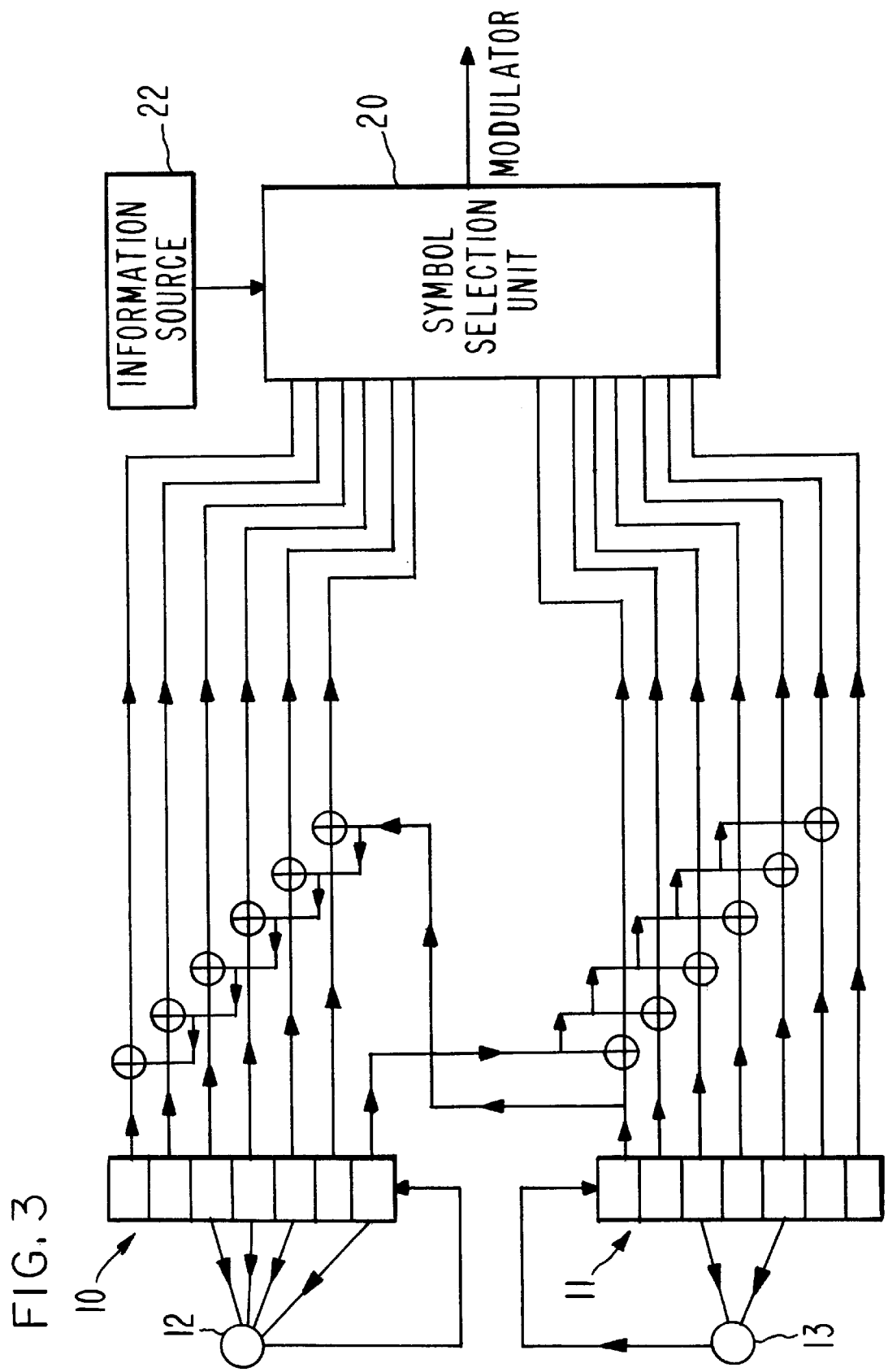
FIG. 3 is a schematic illustration of another alternative embodiment of a spreading-code sequence generator for use in the apparatus of FIG. 1, wherein one of the modulo-2 adders (i.e., "EXCLUSIVE OR" circuits) shown in FIG. 1 is omitted, which enables a maximal-length linear recursive sequence (MLLRS) to be used as one of the possible spreading-code sequences.

The sequences $\{a_k\}$ and $\{b_k\}$ may be accessed by omitting one of the adders shown in FIG. 1, thereby obtaining sequences generated by $f_1$ and $f_2$ alone, as illustrated in FIG. 3.

When $M<2^r\leq 2M-1$, it is advantageous for the $2^r$ spreading-code sequences that are available to each node of the network to be allocated between a subset of $2^{r-1}$ so-called "upper sequences" of the form $\{a_k \oplus b_{k-i}\}$ and a subset of $2^{r-1}$ so-called "lower sequences" of the form $\{a_k \oplus b_{k-i}\}$. However, when $2^r \leq M$, it is preferably for all of the spreading-code sequences to be selected from either the upper sequences or the lower sequences. Within a given subset (e.g., a subset consisting only of the upper sequences, or a subset consisting only of the lower sequences), the cross-correlations between different spreading-code sequences are effectively correlations between different offsets of the same maximal-length linear recursive sequence (MLLRS) and have the value −1, which is very small compared to the length of the sequence ($2^n-1$). On contrast, the correlation between a sequence selected from the subset of upper sequences and a sequence selected from the subset of lower sequences has a magnitude of either 1 or $2^{\lfloor(n+1)/2\rfloor}$, assuming Gold code sequences are used, where $2^{\lfloor(n+1)/2\rfloor}$ is small compared to ($2^n-1$) but large compared to 1. Thus, if $2^r \leq M$, optimal cross-correlation properties among all the spreading-code sequences assigned to a given node can be assured by selecting all of the spreading-code sequences from the same subset of either upper sequences or lower sequences. If $M<2^r\leq 2M-1$, optimal cross-correlation properties among all the spreading-code sequences assigned to a given node can be substantially achieved by selecting $2^{r-1}$ spreading-code sequences from each of the subsets of upper and lower sequences, and by using an appropriate symbol detection scheme as described hereinafter.

When the two correlations of largest magnitude from among all the correlations between each of the candidate spreading-code sequences assigned to a particular node and an incoming spreading-code sequence received by that node are so close in magnitude that it is impossible on the basis of the correlation values alone to determine reliably which one of those two candidate sequences is the "correct" sequence (i.e., the sequence bearing the information intended for that particular node), the following procedure can then be initiated to determine the "correct" sequence. The set of $2^r$ spreading-code sequences is considered to consist of two subsets, viz., the "upper sequences" and the "lower sequences" described above, each of which consists of $2^{r-1}$ sequences. For each of the two subsets, a "punctured" sum of the correlation magnitudes (i.e., the sum of all the correlation values except the largest one) is computed. The subset having the smaller "punctured" sum is then assumed to be the "correct" subset, i.e., to contain the "correct" spreading-code sequence. The "correct" spreading-code sequence is then identified as the sequence within the "correct" subset that has the largest correlation magnitude with respect to the incoming spreading-code sequence.

The rationale for assuming that the "correct" spreading-code sequence (i.e., the sequence bearing the information intended for the particular node) is contained in the subset having the smaller "punctured" sum is grounded on the fact that the correlation values between different sequences within the "correct" subset must all have a magnitude of 1, whereas the magnitudes of the correlation values of spreading-code sequences in different subsets are either 1 or $2^{\lfloor(n+1)/2\rfloor}$ with equal probability. Consequently, when an errorless spreading-code sequence is correlated with all of the $2^r$ spreading-code sequences that are candidates for selection, the "punctured" sum of the correlation magnitudes for the subset containing the "correct" incoming sequence is $(2^{r-1}-1)$, whereas the "punctured" sum of the correlation magnitudes that would be expected for the subset containing an "incorrect" incoming sequence is $$2^{r-2}+(2^{r-2}-1)2^{\lfloor(n+1)/2\rfloor},$$

assuming that the correlation magnitudes for spreading-code sequences from the "incorrect" subset are divided equally between the values 1 and $2^{\lfloor(n+1)/2\rfloor}$. The ratio between the largest and the smallest "punctured" sums, which may be considered as the "expected margin" between the subset containing the "correct" sequence and the subset containing an "incorrect" sequence, is approximately $2^{\lfloor(n-1)/2\rfloor}$.

The foregoing analysis assumes that $2^{r-2}$ of the $2^{r-1}$ sequences in the "incorrect" subset have correlation magnitudes of 1 with respect to the "correct" incoming sequence, and that the $2^{r-2}$ remaining sequences in the "incorrect" subset have correlation magnitudes of $2^{\lfloor(n+1)/2\rfloor}$. However, this assumption actually only represents an average condition. As r increases in value within the range $2^r \leq 2M-1$, the assumption becomes more accurate, provided that each of the correlation magnitudes 1 and $2^{\lfloor(n+1)/2\rfloor}$ independently occurs with a probability of 0.5. This "balance" between the subsets of upper and lower sequences increases as the value of r increases. Thus, the probability of selecting the "correct" subset increases as the number $2^r$ of spreading-code sequences increases.

The "symbol decision" logic by which the spreading-code sequences assigned to the individual nodes of a multi-node digital communications network as illustrated in FIG. 1 are selected is described as follows. Let L and N denote the spreading-code sequences corresponding to the largest and the next-largest correlation magnitudes, respectively, of a set of $2^r$ "symbols" (i.e., sequences). For purposes of this discussion, the designations L and N can denote both the sequences and also the magnitudes of the correlations of these sequences with the received signal. To determine the "correct" symbol, first compute the ratio R=L/N, and then compare R with a selectable first threshold value $T_1$. If $R>T_1$, choose L. If $R \leq T_1$, then a "symbol decision" algorithm is utilized as follows:

1) If L and N are sequences in the same subset, declare an erasure. If L and N are not in the same subset, then for each of the two subsets computer the sum of all correlation magnitudes except the largest correlation magnitude in each subset (i.e., except L and N). Denote the subset corresponding to the smaller of these two sums by $S_1$, and the subset corresponding to the larger of these two sums by $S_2$. Let $N_1$ denote the next-largest correlation magnitude in $S_1$.

2) If L is in S, and N is in $S_2$, compare the ratio $L/N_1$ with a selectable second threshold value $T_2$. If $L/N_1>T_2$, choose L. If $L/N_1 \leq T_2$, then declare an erasure.

3) If L is in $S_2$ and N is in $S_1$, then if $N/N_1>T_2$, choose N, and if $N/N_1 \leq T_2$, declare an erasure.

Using the foregoing algorithm, it is possible for strong correlations between candidate spreading-code sequences and the information-bearing sequences that are actually transmitted by other nodes of the network to be rejected. Regardless of whether all the candidate spreading-code sequences are selected from the same subset of upper or lower sequences, or are equally divided between sequences from each subset, a "symbol decision" error can occur when a signal from an unintended node of the network strongly correlates with one of the candidate spreading-code sequences, or when a sequence belonging to the intended node correlates more strongly than does the "correct" sequence with the received signal. The probability of such a strong correlation occurring decreases as the number $2^r$ of spreading-code sequences per node increases. Thus, the use of multiple spreading-code sequences per node not only provides robustness, but also reduces the effect of the "near-far" problem.

In principle, any number of temporally contiguous bits can be designated as a "symbol". However, if composite code sequences (e.g., Gold code sequences, symmetric sequences, or Kasami code sequences) are used as the spreading-code sequences, advantageous auto-correlation and cross-correlation properties can be guaranteed only if the correlations are performed over an entire period of each sequence in the family of possible sequences. Thus, it is advantageous to designate the entire period of a composite code sequence as the "symbol". If each node of the network can use $2^r$ spreading-code sequences, then each symbol represents r bits. The "inverse" (or "reciprocal") of a symbol is formed by replacing each 0 by a 1, and each 1 by a 0. By transmitting the inverse of a symbol along with the symbol, an additional bit of differentially encoded information per symbol can be transmitted. Thus, the information rate that can be achieved using a network as illustrated in FIG. 1 is $$\frac{c(r+1)}{(2^n-1)},$$

where c is the number of chips (i.e., bits of the spreading-code sequence) transmitted per second.

To ensure that there is a balance between the number of 1's and 0's transmitted, a symbol interval could be taken to be equal to the duration of two periods of a spreading-code sequence. Opposite polarities of the spreading-code sequence would be transmitted during the first and second halves of the symbol interval. This technique would increase the processing gain, but would decrease the information rate by a factor of 2. In practice, it should not be necessary to use this technique if the information-bearing sequence is random, because polarity inversions of random sequences occur approximately half the time anyway. Input sequence randomizers are commonly employed in digital communication systems, and use of such an expedient can be assumed where appropriate in practicing the present invention.

Figure 4:
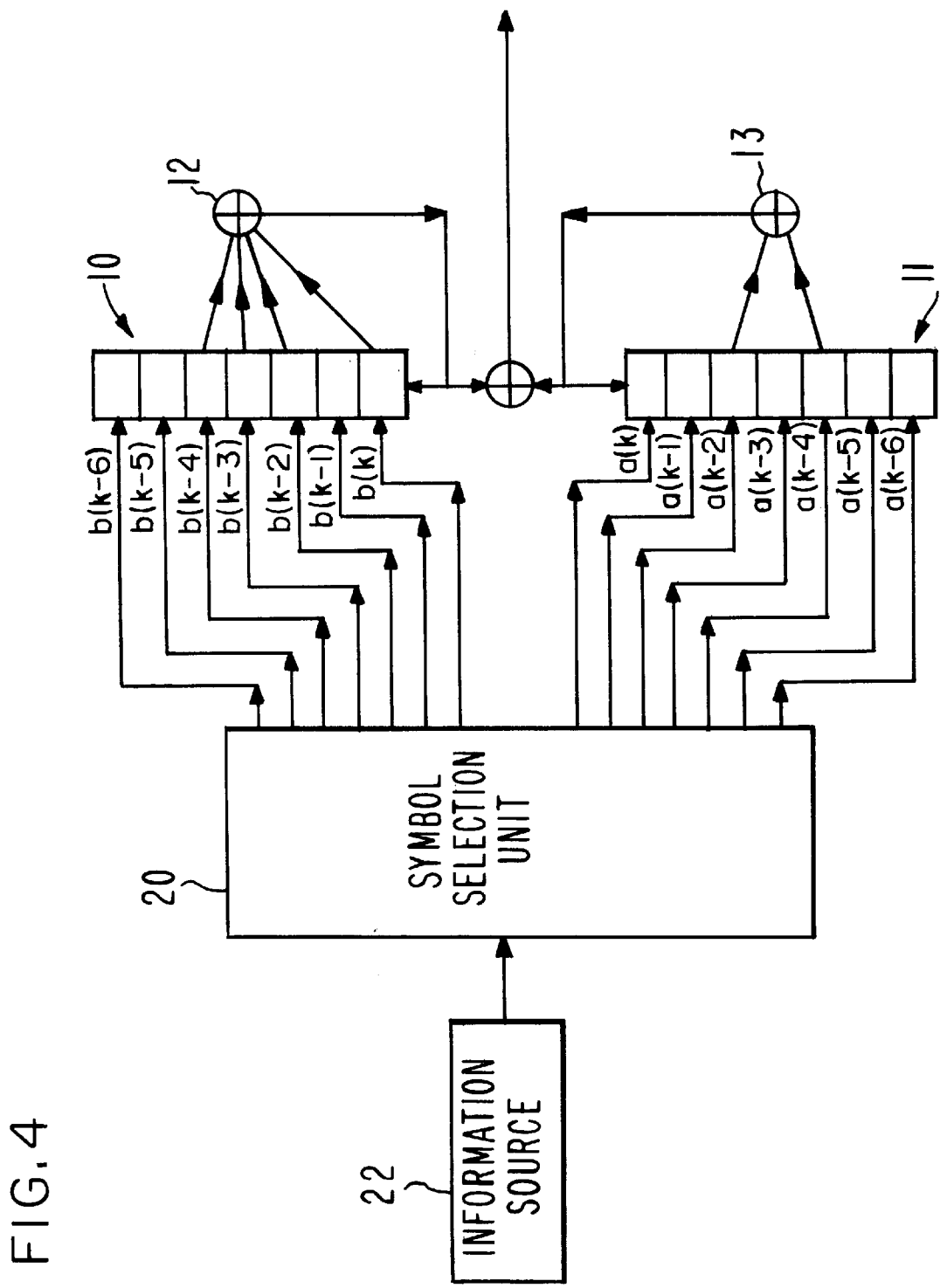
FIG. 4 is a schematic illustration of yet another alternative embodiment of a spreading-code sequence generator for use in the apparatus of FIG. 1, which allows information to be transmitted by switching in register contents (called "fills") obtained from look-up tables at the beginning of each symbol interval.

In an alternative embodiment of the present invention as illustrated in FIG. 4, only one spreading-code sequence is selected for transmission during a given symbol interval. After a particular symbol has been transmitted, appropriate register fills for the next symbol are "looked up" from a table and are "switched in." Where the registers are driven by polynomials (as where composite codes are used for the spreading-code sequences), the use of a "look up" table is a preferred embodiment that minimizes hardware requirements for the transmitter (but not for the receiver). In FIG. 4, the last two stages of each of the registers 10 and 11 are unnecessary, because the number of bits in the "switched-in" fills need be no greater than the degrees of the polynomials that generate the linear recursive sequences. Furthermore, in the embodiment of FIG. 4, the number of spreading-code sequences that can be assigned to each node is not limited by the register length M as in the case in the embodiment of FIG. 1 in which the number of sequences available to the node is bounded above by 2M−1.

The technique described above for transmitting information by using multiple "almost-orthogonal" spreading-code sequences according to the present invention provides performance advantages over other modulation schemes that have ben used in the prior art. According to the technique described above, the number of bits of information per symbol increases as the number $2^r$ of spreading-code sequences increases, yet the "distance" between symbols (i.e., the cross-correlation values of the sequences) does not change as the number $2^r$ of spreading-code sequences increases. This is contrary to the usual situation encountered in digital communication systems that utilize, e.g., quadrature-amplitude modulation (QAM).

In QAM systems, amplitude-phase states function as symbols. Thus, an increase in the number of amplitude-phase states results in an increase in the information rate of a QAM system, but also results in an increase in the bit-error rate. The increase in the bit-error rate occurs because, for a given average energy level, the amplitude-phase states become "closer" to each other in the Euclidean sense (i.e., the distance between adjacent amplitude-phase states decreases) as the number of amplitude-phase states increases, thereby making them harder to distinguish from each other. However, where orthogonal spreading-code sequences function as symbols, as in the present invention, the symbols are never "close" to each other regardless of the number of symbols used. Consequently, for systems that utilize orthogonal spreading-code sequences, the symbol error rate does not increase as rapidly as the information rate when the number of symbols increases.

In TABLE I, values for various performance-measuring parameters are listed as functions of the parameters n and K for a network according to a first embodiment of the present invention as illustrated in FIGS. 1–4. A "chip rate" (i.e., the number of bits of the spreading-code sequence transmitted per second) of 2.5 MHz is arbitrarily assumed, although in practice the chip rate can be chosen to optimize system parameters such as bandwidth and information rate for the particular application. If a different chip rate were to be used, the information rate could be obtained by multiplying the appropriate value in the last column of TABLE I (i.e., the BPSK modulation rate) by c/2.5 MHz, where c is the number of chips transmitted per second expressed in MHz. The embodiment of FIGS. 1–4 is operated in a mode in which a single spreading-code sequence modulates a carrier to generate a BPSK signal, where n is the degree of the polynomials $f_1$ and $f_2$ used for generating the spreading-code sequences, and where K is the number of sequences per user.

Also listed in TABLE I are useful measures of processing gain for different degrees of the polynomials $f_1$ and $f_2$. The first number in each entry in the column labelled "Processing Gain" is the value for $10 \log_{10}(2^n-1)$ expressed in dB, which represents the processing gain against other spreading-code sequences assigned to the given node, assuming that synchronization is maintained and that the correct subset is chosen (when applicable, as discussed above). The second number, which is shown in parentheses, in each entry in the column labelled "Processing Gain" represents the processing gain against spreading-code sequences transmitted by other nodes in the network, using the same polynomials $f_1$ and $f_2$ for generating the spreading-code sequences.

TABLE I

| Degree n | Processing Gain (dB) | Sequences per Node $K = 2^r$ | Information Rate (bits/period) $r + 1$ | Number of Nodes $2^{n-r}$ | Information Rate (kbits/sec) BPSK (2.5 MHz) |
|---|---|---|---|---|---|
| 8 | 24 (12) | 16 | 5 | 16 | 49.0 |
| 8 |  | 32 | 6 | 8 | 58.8 |
| 9 | 27 (13) | 16 | 5 | 32 | 24.5 |
| 9 |  | 32 | 6 | 16 | 29.4 |
| 10 | 30 (15) | 32 | 6 | 32 | 14.7 |
| 10 |  | 64 | 7 | 16 | 17.1 |
| 11 | 33 (16) | 32 | 6 | 64 | 7.3 |
| 11 |  | 64 | 7 | 32 | 8.5 |
| 12 | 36 (13) | 16 | 5 | 256 | 3.1 |
| 12 |  | 32 | 6 | 128 | 3.7 |
| 12 |  | 64 | 7 | 64 | 4.3 |
| 13 | 39 (19) | 32 | 6 | 256 | 1.8 |
| 14 | 42 (21) | 32 | 6 | 512 | 0.9 |
| 14 |  | 64 | 7 | 256 | 1.1 |

EMBODIMENT II

Figure 5:
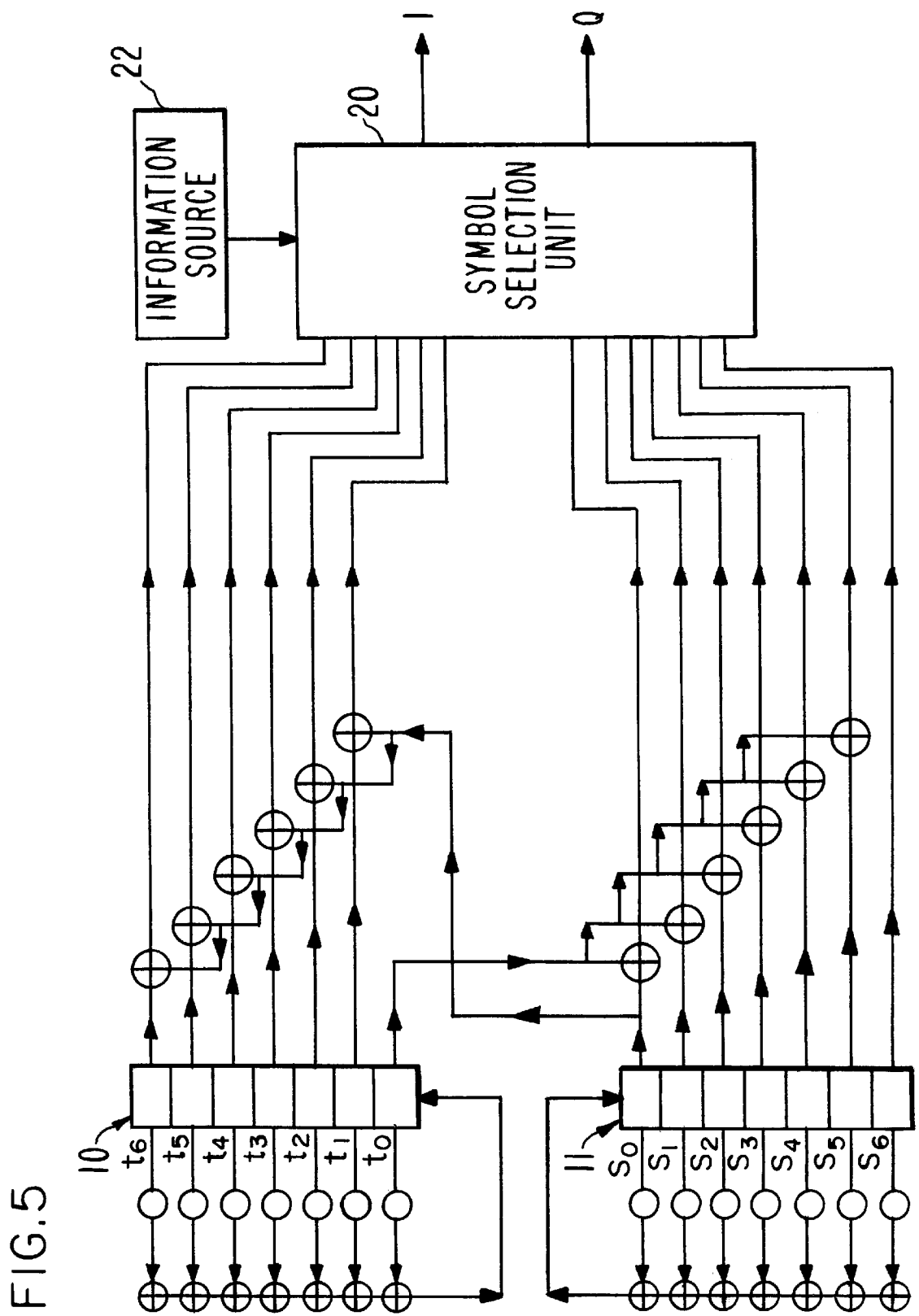
FIG. 5 is a schematic representation of a procedure according to the present invention whereby two sequences are selected from the set of sequences that are available to a given node of the network for modulating two sinusoidal carriers, which are of the same frequency but which differ in phase by 90°.

In an alternative embodiment of the present invention, as illustrated in FIG. 5, two spreading-code sequences are selected from among all the available spreading-code sequences generated by the shift registers 10 and 11 during each period of the sequences. The selected sequences are used to modulate the "in-phase" arm and/or the "quadrature" arm, (also called the I-arm and the Q-arm), respectively, of a sinusoidal carrier. Modulation of the I-arm and the Q-arm can be achieved using a quaternary phase-shift keyed (QPSK) modulation, an offset QPSK (also called an OQPSK) modulation, a quadrature partial response (QPR) modulation, or any other type of quadrature modulation. If K spreading-code sequences are available to each node of the network, there are $$\frac{K(K-1)}{2}$$

possible pairs of spreading-code sequences that can be transmitted per symbol interval. Thus, by selecting two of the K available spreading-code sequences for transmission during each symbol interval, $$\left[ \log_2 \frac{K(K-1)}{2} \right]$$

bits of information can be conveyed per symbol.

If the polarities of the spreading-code sequences can be selectively inverted or not inverted, another information bit can be conveyed per symbol so as to increase the total number of bits of information that can be conveyed per symbol to $$1 + \left[ \log_2 \frac{K(K-1)}{2} \right].$$

Thus, for example, if K=9, the number of information bits per symbol is $1+[\log_2 36]=6$. The two sequences to be transmitted during each symbol interval are chosen by table lookup. Whether or not to invert the spreading-code sequences is determined by differential encoding of one of the six bits.

In TABLE II, values for various performance-measuring parameters are listed as functions of the parameters n and M for a network as illustrated in FIG. 5, again assuming a chip rate of 2.5 MHz. The spreading-code sequence generator shown in FIG. 4 has a coherent receiver, so as to be able to distinguish and track the I-arm and the Q-arm of the carrier. It is possible that a given spreading-code sequence could appear in the I-arm during one symbol interval, and in the Q-arm during another symbol interval.

TABLE II

| Degree n | Processing Gain (dB) | Sequences per Node K | Information Rate (bits/period) $1 + \left[ \log_2 \frac{K(K-1)}{2} \right]$ | Number of Nodes $\left[ \frac{(2^n+1)}{K} \right]$ | Information Rate (kbits/sec) (2.5 MHz) |
|---|---|---|---|---|---|
| 8 | 24 (12) | 9 | 6 | 28 | 68.6 |
| 8 |  | 12 | 7 | 21 | 78.4 |
| 9 | 27 (13) | 9 | 6 | 57 | 34.2 |
| 9 |  | 12 | 7 | 42 | 39.1 |
| 9 |  | 17 | 8 | 30 | 44.0 |
| 9 |  | 24 | 9 | 21 | 48.9 |

TABLE II-continued

| Degree n | Processing Gain (dB) | Sequences per Node K | Information Rate (bits/period) $1 + \left[ \log_2 \frac{K(K-1)}{2} \right]$ | Number of Nodes $\left[ \frac{(2^n + 1)}{K} \right]$ | Information Rate (kbits/sec) (2.5 MHz) |
|---|---|---|---|---|---|
| 10 | 30 (15) | 9 | 6 | 113 | 17.1 |
| 10 |  | 12 | 7 | 85 | 19.6 |
| 10 |  | 17 | 8 | 60 | 22.0 |
| 10 |  | 24 | 9 | 42 | 24.4 |
| 11 | 33 (16) | 9 | 6 | 227 | 8.5 |
| 11 |  | 12 | 7 | 170 | 9.8 |
| 11 |  | 17 | 8 | 120 | 11.0 |
| 11 |  | 24 | 9 | 85 | 12.2 |
| 11 |  | 33 | 10 | 62 | 13.4 |
| 12 | 36 (18) | 9 | 6 | 455 | 4.3 |
| 12 |  | 12 | 7 | 341 | 4.9 |
| 12 |  | 17 | 8 | 241 | 5.5 |
| 12 |  | 24 | 9 | 170 | 6.1 |
| 12 |  | 33 | 10 | 124 | 6.7 |

EMBODIMENT III

Figure 6:
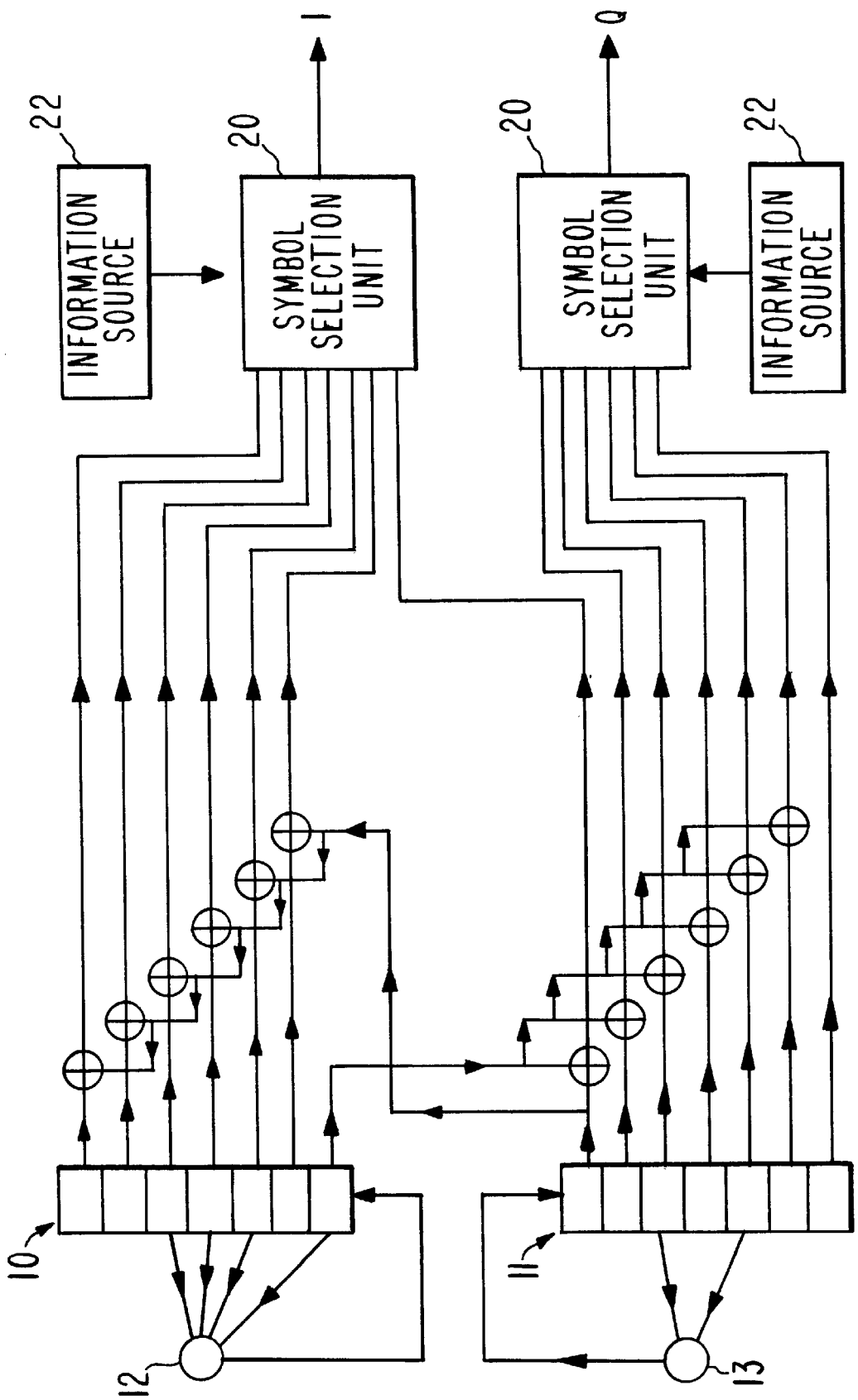
FIG. 6 is a schematic representation of a procedure according to the present invention whereby the set of spreading-code sequences available to a given node of the network is partitioned into two subsets, and whereby sequences are selected from each of the subsets and modulated onto orthogonal carriers.

In a third embodiment of the present invention as illustrated in FIG. 6, two spreading-code sequences are selected during each symbol interval, viz., one "upper" sequence and one "lower" sequence from each of the shift registers 10 and 11. If the number of spreading-code sequences available to each node of the network is $K=2^r$, each subset contains $2^{r-1}$ sequences, so that $2(r-1)$ bits of information can be transmitted per symbol interval. If the polarity of each spreading-code sequence is selectively inverted, or not, according to a differential coding scheme, then $2+[2(r-1)]=2r$ information bits per symbol interval are transmitted. For example, if $K=8$, then six information bits per symbol are transmitted.

Since symbol decisions are made within each subset of spreading-code sequences, there is no need to choose the "correct" subset in order to identify the "correct" spreading-code sequence. Thus, decision logic is considerably simplified. Also, symbol decisions are made between sequences that have optimal cross-correlation properties.

In TABLE III, values are given for the same performance parameters as listed above for the first and second embodiments, again assuming a chip rate of 2.5 MHz.

TABLE III

| Degree n | Processing Gain (dB) | Sequences per Node | Information Rate (bits/period) | Number of Nodes | Information Rate (kbits/sec) (2.5 MHz) |
|---|---|---|---|---|---|
| 8 | 24 (12) | 8 | 6 | 32 | 58.8 |
| 8 |  | 16 | 8 | 16 | 78.4 |
| 8 |  | 32 | 10 | 8 | 98.0 |
| 9 | 27 (13) | 8 | 6 | 64 | 29.3 |
| 9 |  | 16 | 8 | 32 | 39.1 |
| 9 |  | 32 | 10 | 16 | 48.9 |
| 9 |  | 64 | 12 | 8 | 58.7 |
| 10 | 30 (15) | 8 | 6 | 128 | 14.7 |
| 10 |  | 16 | 8 | 64 | 19.6 |
| 10 |  | 32 | 10 | 32 | 24.4 |
| 10 |  | 64 | 6 | 16 | 29.3 |
| 11 | 33 (16) | 8 | 6 | 256 | 7.3 |
| 11 |  | 16 | 8 | 128 | 9.8 |
| 11 |  | 32 | 10 | 64 | 12.2 |
| 11 |  | 64 | 12 | 32 | 14.7 |
| 12 | 36 (18) | 8 | 6 | 455 | 4.3 |
| 12 |  | 16 | 8 | 256 | 4.9 |
| 12 |  | 32 | 10 | 128 | 6.1 |
| 12 |  | 64 | 12 | 64 | 7.3 |

TABLE III-continued

EMBODIMENT IV

Figure 7:
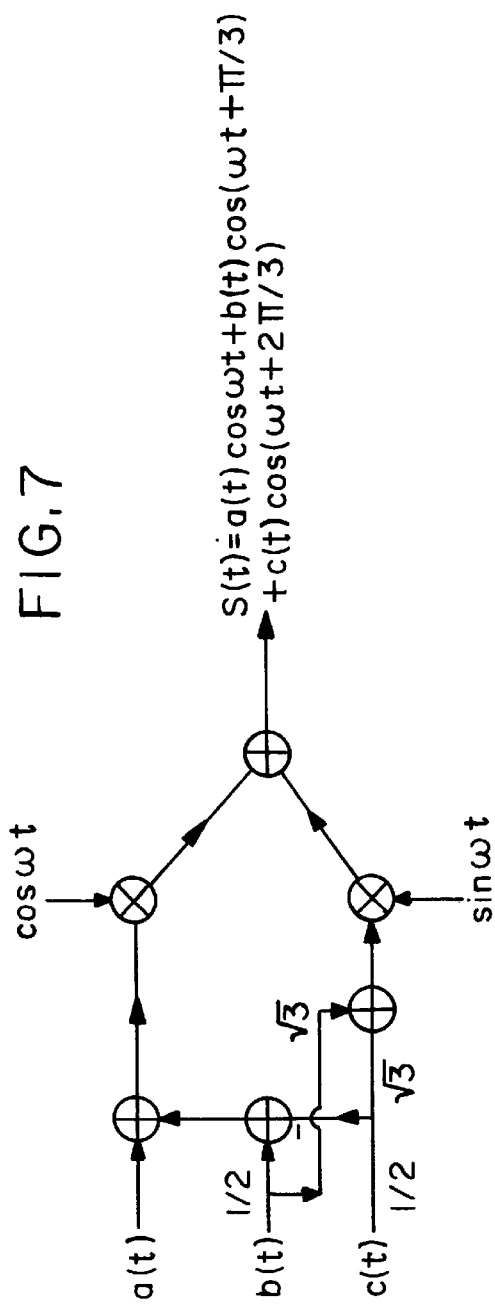
FIG. 7 is a schematic representation of a procedure according to the present invention whereby three sequences are selected from the set of sequences that are available to a given node of the network, and are combined so as to be capable in effect of modulating three sinusoidal carriers of the same frequency but with relative phases of 0°, 60° and 120°.

In a fourth embodiment of the present invention as illustrated in FIG. 7, three spreading-code sequences are selected during each symbol interval for simultaneous transmission using phase-shift keyed (PSK) modulation. The sequence generators shown in FIG. 7 are substantially the same as shown in FIG. 5, except that three spreading-code sequences (rather than two as shown in FIG. 5) are selected and transmitted to the modulator. The three spreading-code sequences are used to modulate a carrier having three components, which are 60° out of phase.

Besides the processing gain available due to the quasi-orthogonally of the spreading-code sequences in the embodiment illustrated in FIG. 7, the phase difference between carriers provides an additional 6 dB of processing gain, as can be seen by computing the correlation between two sinusoidal signals that are 60° out of phase.

If the number of spreading-code sequences available to the node is K, the number of information bits that can be transmitted per symbol interval (including one bit corresponding to whether the spreading-code sequences are transmitted "upright" or "inverted") is given by $$1 + \left[ \log_2 \frac{K(K-1)(K-2)}{6} \right].$$

In TABLE IV, values are given for the same performance parameters as listed above for the first, second and third embodiments, again assuming a chip rate of 2.5 MHz.

TABLE IV

| Degree n | Processing Gain (dB) | Sequences per Node | Information Rate (bits/period) | Number of Nodes | Information Rate (kbits/sec) (2.5 MHz) |
|---|---|---|---|---|---|
| 8 | 12 | 9 | 7 | 28 | 68.6 |
| 8 | | 11 | 8 | 23 | 78.4 |
| 8 | | 14 | 9 | 18 | 88.2 |
| 8 | | 17 | 10 | 15 | 96.0 |
| 8 | | 20 | 11 | 12 | 105.6 |
| 9 | 13.5 | 9 | 7 | 57 | 34.2 |
| 9 | | 11 | 8 | 46 | 39.1 |
| 9 | | 14 | 9 | 36 | 44.0 |
| 9 | | 17 | 10 | 30 | 48.9 |
| 9 | | 20 | 11 | 25 | 53.8 |
| 10 | 15 | 9 | 7 | 113 | 17.1 |
| 10 | | 11 | 8 | 93 | 19.5 |
| 10 | | 14 | 9 | 73 | 22.0 |
| 10 | | 17 | 10 | 60 | 24.4 |
| 10 | | 20 | 11 | 51 | 26.8 |
| 11 | 16.5 | 9 | 7 | 227 | 8.5 |
| 11 | | 11 | 8 | 186 | 9.8 |
| 11 | | 14 | 9 | 146 | 11.1 |
| 11 | | 17 | 10 | 120 | 12.3 |
| 11 | | 20 | 11 | 102 | 13.5 |
| 12 | 18 | 9 | 7 | 455 | 4.3 |
| 12 | | 11 | 8 | 372 | 4.9 |
| 12 | | 14 | 9 | 292 | 5.5 |
| 12 | | 17 | 10 | 241 | 6.1 |
| 12 | | 20 | 11 | 204 | 6.7 |

TABLE V

| Degree n | Processing Gain (dB) | Sequences per Node | Information Rate (bits/period) | Number of Nodes | Information Rate (kbits/sec) (2.5 MHz) |
|---|---|---|---|---|---|
| 8 | 12 | 8 | 7 | 32 | 68.6 |
| 8 | | 10 | 8 | 25 | 78.4 |
| 8 | | 11 | 9 | 23 | 88.2 |
| 8 | | 13 | 10 | 19 | 98.0 |
| 8 | | 15 | 11 | 17 | 107.8 |
| 8 | | 17 | 12 | 15 | 117.6 |
| 9 | 13.5 | 8 | 7 | 64 | 34.2 |
| 9 | | 10 | 8 | 51 | 39.1 |
| 9 | | 11 | 9 | 46 | 44.0 |
| 9 | | 13 | 10 | 39 | 48.9 |
| 9 | | 15 | 11 | 34 | 53.8 |
| 9 | | 17 | 12 | 30 | 58.7 |
| 10 | 15 | 8 | 7 | 128 | 17.1 |
| 10 | | 10 | 8 | 102 | 19.6 |
| 10 | | 11 | 9 | 93 | 22.0 |
| 10 | | 13 | 10 | 78 | 24.4 |
| 10 | | 15 | 11 | 68 | 26.9 |
| 10 | | 17 | 12 | 60 | 29.3 |
| 11 | 16.5 | 8 | 7 | 256 | 8.5 |
| 11 | | 10 | 8 | 204 | 9.8 |
| 11 | | 11 | 9 | 186 | 11.0 |
| 11 | | 13 | 10 | 157 | 12.2 |
| 11 | | 15 | 11 | 136 | 13.4 |
| 11 | | 17 | 12 | 120 | 14.7 |
| 12 | 18 | 8 | 7 | 512 | 4.3 |
| 12 | | 10 | 8 | 409 | 4.9 |
| 12 | | 11 | 9 | 372 | 5.5 |
| 12 | | 13 | 10 | 315 | 6.1 |
| 12 | | 15 | 11 | 273 | 6.7 |
| 12 | | 17 | 12 | 241 | 7.3 |

EMBODIMENT V

Figure 8:
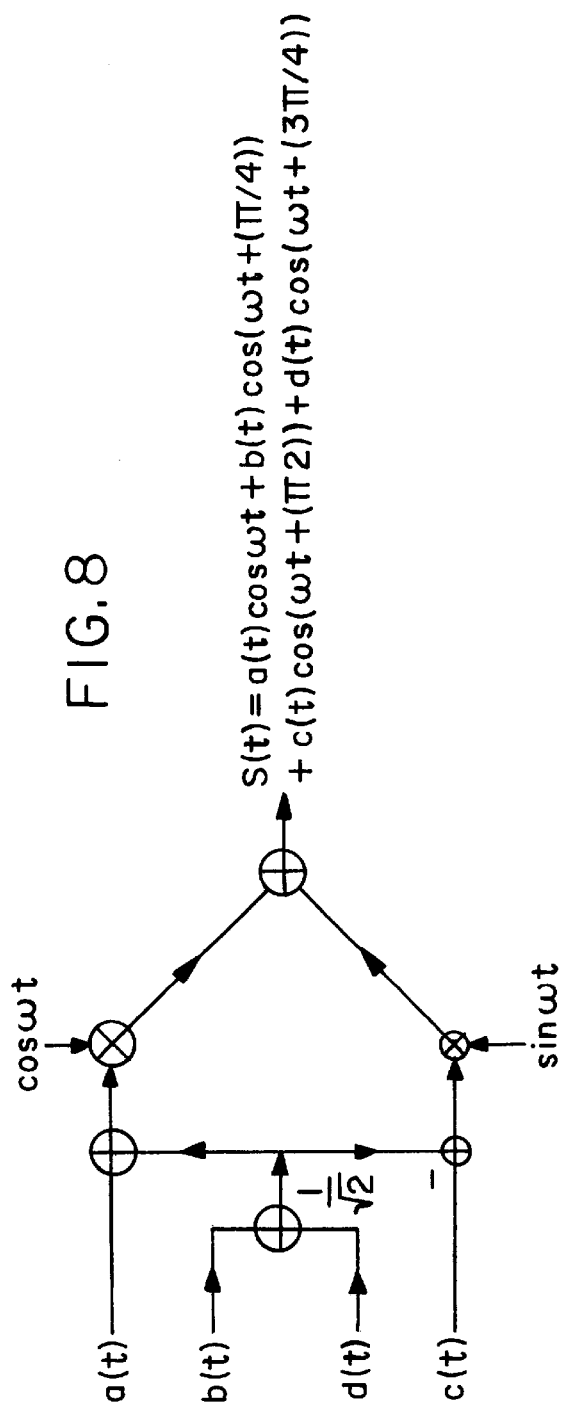
FIG. 8 is a schematic representation of a procedure according to the present invention whereby four sequences are selected from the set of sequences that are available to a given node of the network, and are combined so as to be capable in effect of modulating four sinusoidal carriers of the same frequency but with relative phases of 0°, 45°, 90° and 135°.

In FIG. 8, a fifth embodiment of the present invention is illustrated, in which four spreading-code sequences are transmitted per symbol interval using "quaternion" phase-shift keyed modulation. The sequence generators shown in FIG. 7 are substantially the same as shown in FIG. 5, except that four spreading-code sequences (rather than two as shown in FIG. 5) are selected and transmitted to the modulator. The four spreading-code sequences are used to modulate a carrier having four components, which are 45° out of phase.

Besides the processing gain available due to the quasi-orthogonality of the spreading-code sequences in the embodiment illustrated in FIG. 8, the phase difference between carriers provides an additional 3 dB of processing gain, as can be seen by computing the correlation between two sinusoidal signals that are 45° out of phase.

If the number of spreading-code sequences available to a node is K, the number of information bits that can be transmitted per symbol interval (including one bit corresponding to whether the spreading-code sequences are transmitted "upright" or "inverted") is given by $$1 + \left[ \log_2 \frac{K(K-1)(K-2)(K-3)}{24} \right].$$

For example, if K=8, the number of information bits that can be transmitted per symbol is 7. In TABLE V, values are given for the same performance parameters as listed above for the other embodiments, again assuming a chip rate of 2.5 MHz.

EMBODIMENT VI

The foregoing embodiments I, II, III, IV and V of the present invention can be used for multi-node digital communication networks operating in modes in which spreading-code sequences are the sums of linear recursive sequences generated using feedback taps in each register of a two-register sequence generator. However, for privacy purposes, a multi-node digital communication network according to the present invention could also be used in a "code hopping" mode in which the spreading-code sequences are derived from externally generated sequences. Use of a communication network according to the present invention in a "code hopping" mode illustrates the power of the two-register configuration in preventing false synchronization, and in providing multiple information bits per symbol regardless of the manner of generating the spreading code.

Figure 9:
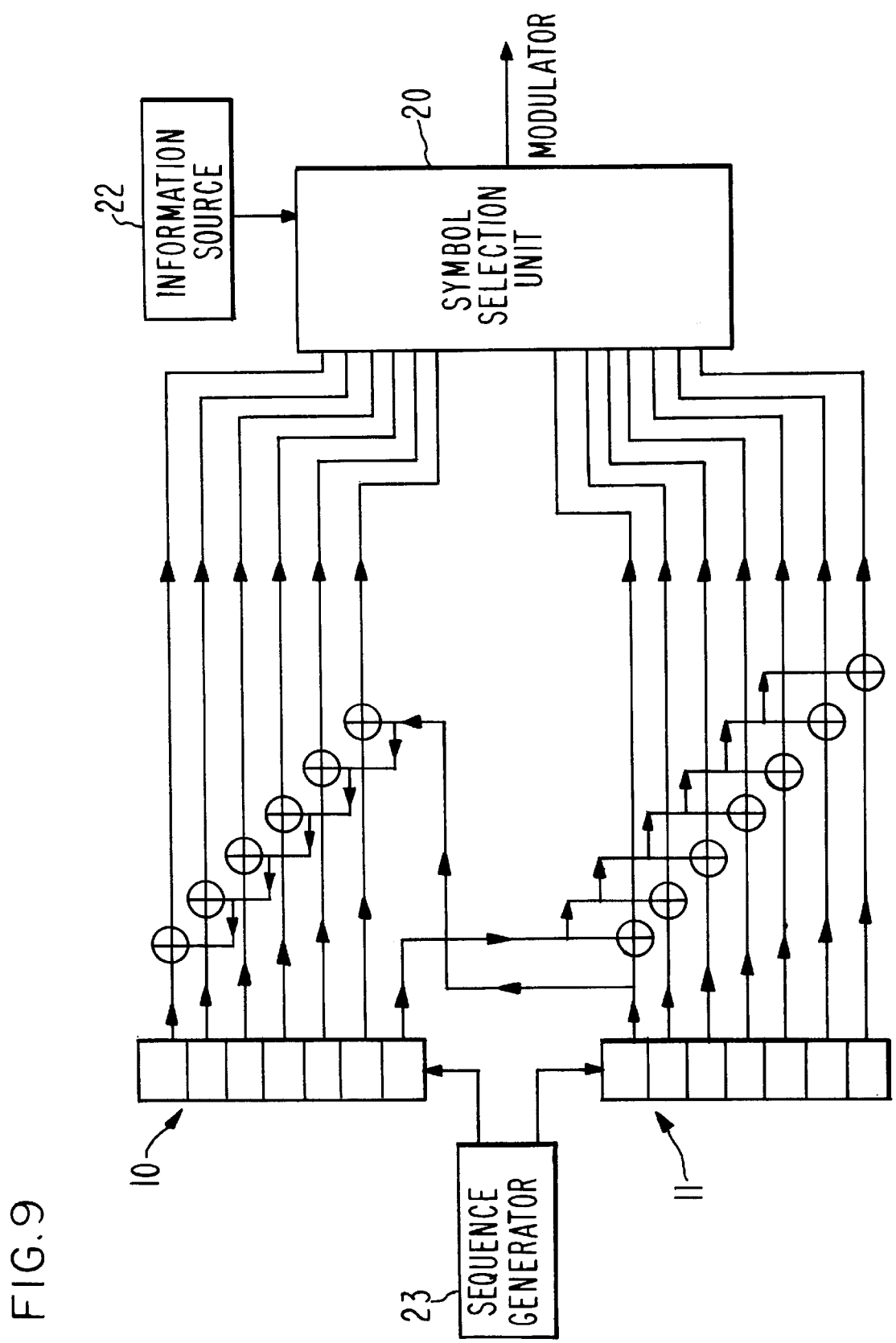
FIG. 9 is a schematic representation of a procedure according to the present invention whereby externally generated spreading-code sequences serve as inputs to two shift registers for generating unique spreading-code sequences.

A "code hopping" technique according to the present invention is illustrated in FIG. 9, which indicates switching at regular intervals between different spreading-code sequences, where each "input" sequence is arbitrarily selected and may be externally generated by a sequence generator 23. The switching intervals can be independent of any periodicities associated with input sequences. One or more input sequences may be selectively transmitted during a given switching interval, just as in the other embodiments. The particular input sequence or sequences selected for transmission during a given switching interval are determined by the symbol selection unit 20 on the basis of the information bits to be conveyed (as in the above-described embodiments), or on the basis of "cipher bits" used to maximize privacy by code hopping. In the code hopping mode, information is conveyed by polarity inversions, just as in ordinary direct-sequence spread-spectrum communications. In general, there is no necessary relationship between the information rate and the code hopping rate.

The previous embodiments I, II, III and IV can be used for either synchronous operation (i.e., all nodes of the network are synchronized to a central node) or asynchronous operation (i.e., synchrony is obtained only when communication takes place). In the "code hopping" embodiment, however, synchronous operation is necessary because the externally generated spreading-code sequences are unique to each node, and communication between nodes must be coordinated by a central controller.

In a code hopping mode, low cross-correlation between spreading-code sequences is not guaranteed. In fact, the cross-correlation statistics for spreading-code sequences in a "code hopping" mode are similar to the cross-correlation statistics for random sequences. For example, if the symbol interval contains 2047 chips, approximately 5% of the correlation values should exceed $$\sqrt{2047} \approx 90.$$

By contrast, if a Gold Code is used, the maximum correlation magnitude is only $1+2^6=65$. Thus, symbol errors are considerably more likely to occur in a "code hopping" mode than in a mode in which composite codes are used for the spreading-code sequences, and in which switching between spreading-code sequences occur at intervals equal to the period of the sequences. However, a "code-hopping" technique could be effective, provided error-correction coding is used. It is noteworthy that in some star-networked local area networks, the correlation statistics of random sequences are accommodated with acceptable bit error rates.

Figures 10, 11:
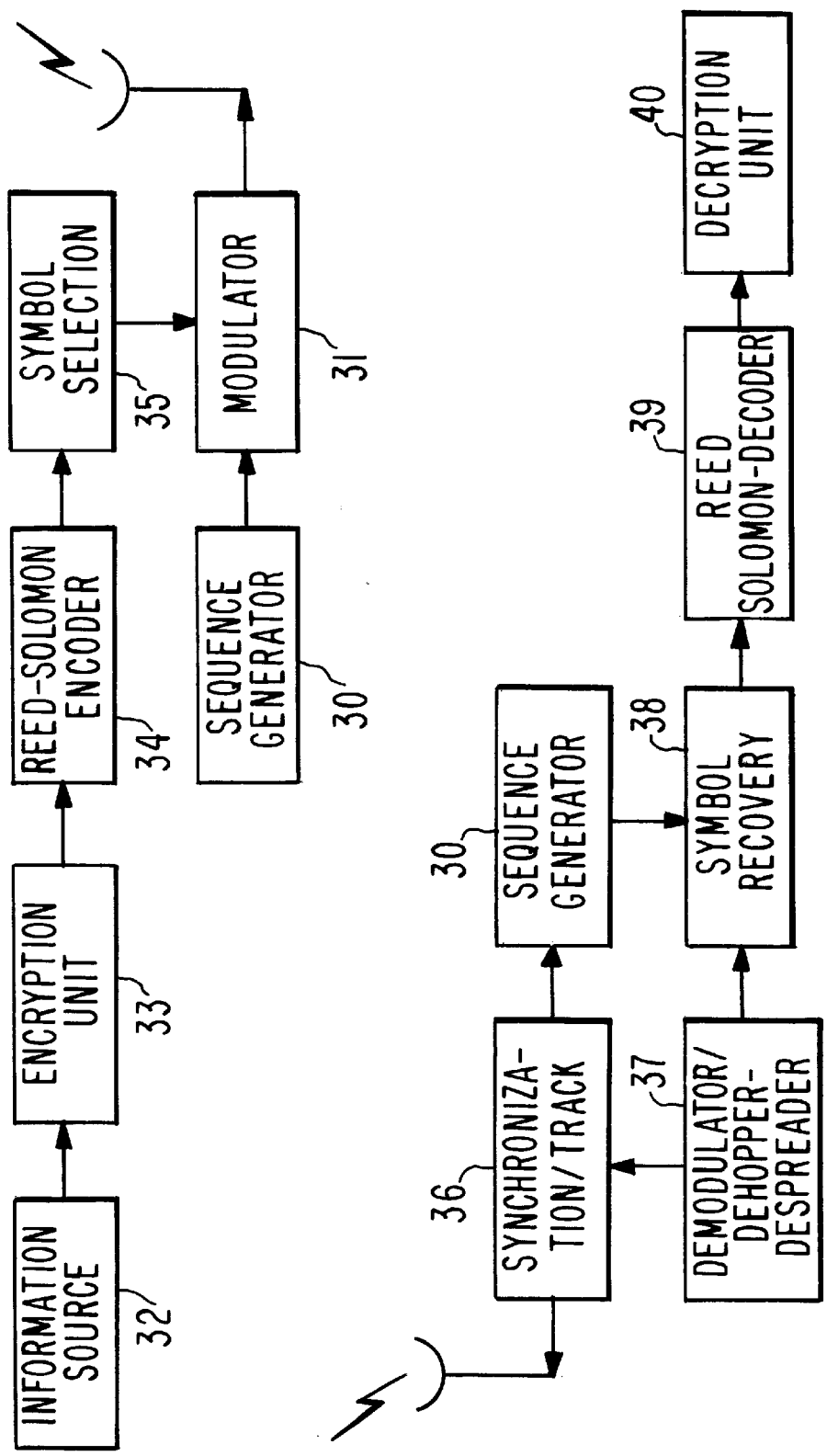
FIG. 10 is a block diagram of a transmitter for use by a node of a multi-node digital communication network according to the present invention.
FIG. 11 is a block diagram of a receiver for use by a node of a multi-node digital communication network according to the present invention.

A transmitter for each node of a multi-node digital communication network according to the present invention is illustrated schematically in FIG. 10 in which the spreading-code sequence generator of FIG. 1 is indicated by the reference number 30. Output from the sequence generator 20 serves as input for a modulator 31, which can use a conventional modulation technique such as BPSK, QPSK, OQPSK, etc. As also shown in FIG. 10, output from an information source 32 is encrypted by an encryption unit 33, which could optionally use the Data Encryption Standard certified by the National Bureau of Standards.

Encrypted output from the encryption unit 33 serves as input to a Reed-Solomon encoder 34, which is programmable to specify information rates that are appropriate for the specified embodiment, and for the particular mode of operation (e.g., using Gold code sequences, random sequences, etc.). Error-control coded output from the Reed-Solomon encoder 34 serves as input to a symbol selection unit 35, which could be implemented in software on a commercially available microprocessor.

The symbol selection unit 35 selects one or more candidate spreading-code sequences from among all the spreading-code sequences available to a particular node of the network for input to the modulator 31. The modulator 31 modulates the outputs of the sequence generator 30 onto a carrier for transmission. A signal encoded in accordance with the present invention is then transmitted by a modulator 31 to the various nodes of the network.

A receiver for each node of a network according to the present invention is illustrated schematically in FIG. 11 in which the spreading-code sequence generator of FIG. 1 is indicated by the reference number 30. A synchronization-and-tracking unit 36 is used to maintain continuous communications. Synchronization and tracking techniques for spread-spectrum systems are well-developed in the art, and form the subject of an expansive body of literature. A demodulator 37 heterodynes the spread-spectrum signal to baseband. In the case of a hybrid frequency-hopped direct-sequence implementation, the demodulator 37 provides baseband chip-synchronized data to a symbol recovery unit 38, which makes symbol decisions and provides the bits associated with each recovered symbol to a Reed-Solomon decoder 39.

Figure 12:
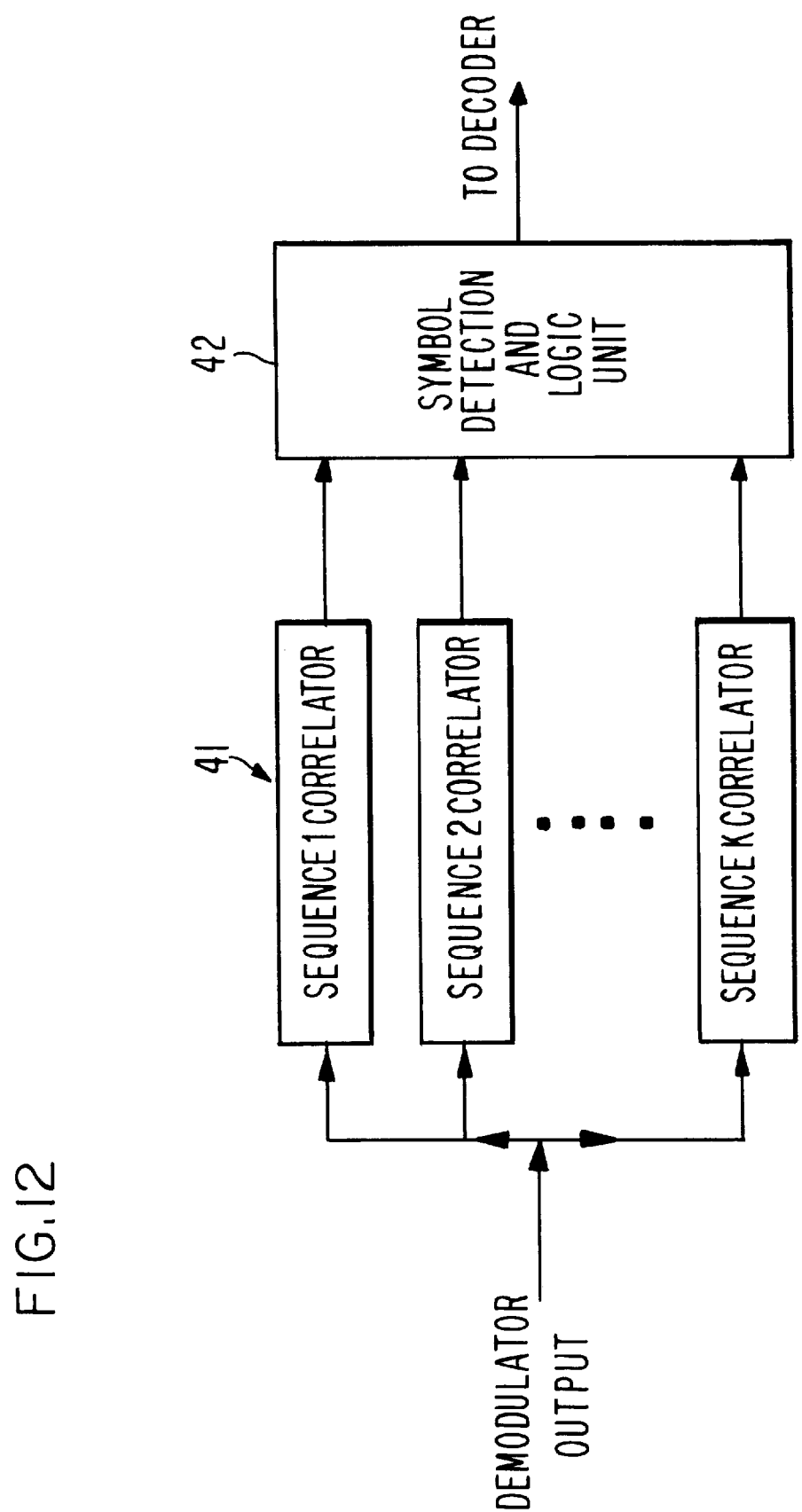
FIG. 12 is a block diagram of a correlation unit of the receiver of FIG. 11, which correlates each in-coming spreading-code sequence detected by the receiver with all the spreading-code sequences that are available to the node.

As shown in FIG. 12, the symbol recovery unit 38 of FIG. 11 includes a correlation unit 41 and a symbol detection and logic unit 42. The symbol recovery unit 38 correlates the input signal with each candidate spreading-code sequence. The symbol detection and logic unit 42 determines the strongest correlation outputs, makes a decision on the most likely transmitted sequence or sequences, and makes symbols-to-bits assignments. The Reed-Solomon decoder 39 of FIG. 11 processes the recovered symbols, and passes the decoded bitstream to a decryptor 40, if encryption is to be used.

The present invention has been described above in terms of particular classes of spreading-code sequences, a particular type of error-control coding (viz., Reed-Solomon coding), constrained numbers of symbols per node, particular methods of assigning blocks of information bits to symbols (in the case of a multiple-symbol information transmission mode) or of assigning blocks of information bits from a key generator (in the case of an information transmission mode in which spreading-code sequences are provided from an external source), a particular method of making symbol decisions, and particular methods of operating in multiple-symbol information transmission modes. However, other classes of spreading-code sequences, error-control coding schemes, symbol selection schemes, decision schemes, and methods of operation that are more advantageously suited to particular applications and/or environments would be apparent to practitioners skilled in the art of spread-spectrum digital communications upon perusal of the foregoing specification and the accompanying drawing. Accordingly, the foregoing description is to be understood as merely illustrative of the invention, which is defined more generally by the following claims and their equivalents.

I claim:

1. A signal comprising a set of binary spreading-code sequences modulated onto a sinusoidal carrier, said set of binary spreading-code sequences being produced by a process of simultaneously:

a) combining contents of a single stage of a first multi-stage binary shift register with contents of each stage of a plurality of stages of a second multi-stage binary shift register, the contents of each stage of each of said first and second binary shift registers having a period of $(2^n-1)$, where n is a fixed integer having the same value for each of said first and second binary shift registers, the contents of said stages of said first and second binary shift registers being combined by modulo-2 addition to produce a first subset of combined spreading-code sequences, and b) combining contents of a single stage of said second binary shift register with contents of each stage of a plurality of stages of said first binary shift register by modulo-2 addition to produce a second subset of combined spreading-code sequences, said first and second subsets of combined spreading-code sequences having cross-correlation properties as follows:

(i) a cross-correlation between any two of said combined binary spreading-code sequences over any contiguous $(2^n-1)$ bits has a magnitude $\leq (2^{[(n+1)/2]}+1),$ where $[(n+1)/2]$ denotes the greatest integer $\leq (n+1)/2$; and (ii) a cross-correlation at zero offset between any two of said combined binary spreading-code sequences in either one of said first and second subsets has a magnitude equal to one.

2. A signal comprising a set of binary spreading-code sequences modulated onto a sinusoidal carrier, said set of binary spreading-code sequences being produced by a process of:

a) specifying a switching interval consisting of a fixed number of steps for each of a first multi-stage binary shift register and a second multi-stage binary shift register, contents of each stage of each of said first and second binary shift registers having a period of $(2^n-1)$, where n is a fixed integer having the same value for each of said first and second binary shift registers;

b) inserting contents into each stage of said first and second binary shift registers once per said switching interval;

c) combining the contents of a single stage of said first binary shift register with the contents of a single stage of said second binary shift register by modulo-2 addition at each step of said first and second binary shift registers to produce binary spreading-code sequences such that any two of said binary spreading-code sequences have cross-correlation properties as follows:

(i) a cross-correlation between any two of said binary spreading-code sequences over any contiguous $(2^n-1)$ bits has a magnitude $\leq (2^{[(n+1)/2]}+1),$ where $[(n+1)/2]$ denotes the greatest integer $\leq (n+1)/2$;

(ii) a cross-correlation at zero offset over any contiguous $(2^n-1)$ bits between any two of said binary spreading-code sequences for which the initial contents of said first binary shift register are identical has a magnitude equal to one; and (iii) a cross-correlation at zero offset over any contiguous $(2^n-1)$ bits between any two of said binary spreading-code sequences for which the initial contents of said second binary shift register are identical has a magnitude equal to one.

* * * * *